(12) United States Patent
Roche, Jr.

(10) Patent No.: US 11,841,831 B2
(45) Date of Patent: *Dec. 12, 2023

(54) TECHNOLOGIES FOR FILE SHARING

(71) Applicant: Saphyre, Inc., Hoboken, NJ (US)

(72) Inventor: Gabino M. Roche, Jr., Hoboken, NJ (US)

(73) Assignee: Saphyre, Inc., Hoboken, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,191

(22) Filed: Aug. 17, 2022

(65) Prior Publication Data

US 2022/0405246 A1    Dec. 22, 2022

Related U.S. Application Data

(63) Continuation of application No. 16/953,830, filed on Nov. 20, 2020, now Pat. No. 11,422,979, which is a
(Continued)

(51) Int. Cl.
| | |
|---|---|
| *G06F 16/22* | (2019.01) |
| *G06F 16/176* | (2019.01) |
| *G06F 16/14* | (2019.01) |
| *G06F 16/93* | (2019.01) |
| *G06F 16/31* | (2019.01) |
| *G06F 16/174* | (2019.01) |
| *G06F 16/33* | (2019.01) |
| *H04L 67/06* | (2022.01) |

(52) U.S. Cl.
CPC .......... *G06F 16/176* (2019.01); *G06F 16/148* (2019.01); *G06F 16/1748* (2019.01); *G06F 16/2272* (2019.01); *G06F 16/322* (2019.01); *G06F 16/325* (2019.01); *G06F 16/3331* (2019.01); *G06F 16/94* (2019.01); *H04L 67/06* (2013.01)

(58) Field of Classification Search
None
See application file for complete search history.

(56) References Cited

U.S. PATENT DOCUMENTS

| | | |
|---|---|---|
| 6,584,466 B1 | 6/2003 | Serbinis et al. |
| 7,167,844 B1 | 1/2007 | Leong et al. |
| (Continued) | | |

FOREIGN PATENT DOCUMENTS

| | | |
|---|---|---|
| CN | 101103354 | 1/2008 |
| CN | 101478549 | 7/2009 |
| (Continued) | | |

OTHER PUBLICATIONS

China Office Action dated May 25, 2021 in related application 201980044729.X filed Jun. 7, 2019 (15 pages).
(Continued)

*Primary Examiner* — Cai Y Chen
(74) *Attorney, Agent, or Firm* — Dentons US LLP

(57) ABSTRACT

This disclosure enables various computing technologies for sharing various files securely and selectively between various predefined user groups based on various predefined workflows. For each of the predefined workflows, the files are shared based on a data structure storing various document identifiers and various metadata tags, with the document identifiers mapping onto the metadata tags.

25 Claims, 35 Drawing Sheets

Related U.S. Application Data continuation of application No. 16/501,110, filed on Jun. 8, 2018, now Pat. No. 10,846,268.

(56) References Cited

U.S. PATENT DOCUMENTS

| | | | |
|---|---|---|---|
| D584,030 S | 1/2009 | Ramierez | |
| D587,725 S | 3/2009 | Krieter et al. | |
| 7,529,723 B2 | 5/2009 | Howard et al. | |
| 7,567,987 B2 | 7/2009 | Shappell et al. | |
| 7,797,638 B2 | 9/2010 | Dev Sareen et al. | |
| D694,259 S | 11/2013 | Klein | |
| 8,615,517 B1 | 12/2013 | Vice et al. | |
| D708,628 S | 7/2014 | Klein et al. | |
| 8,880,436 B2 | 11/2014 | Chan | |
| D741,882 S | 10/2015 | Shmilov et al. | |
| D749,623 S | 2/2016 | Gray et al. | |
| D750,129 S | 2/2016 | Kwon | |
| D752,616 S | 3/2016 | Kouvas et al. | |
| D755,196 S | 5/2016 | Meyers et al. | |
| D756,373 S | 5/2016 | Raskin et al. | |
| D757,028 S | 5/2016 | Goldenberg et al. | |
| 9,330,144 B2 | 5/2016 | Acevedo-Aviles et al. | |
| D759,063 S | 6/2016 | Chen | |
| 9,361,312 B2 | 6/2016 | Kaasten et al. | |
| D763,277 S | 8/2016 | Ahmed et al. | |
| D764,481 S | 8/2016 | Omiya | |
| D764,501 S | 8/2016 | Dias et al. | |
| 9,418,067 B1 | 8/2016 | Vice et al. | |
| 9,430,564 B2 | 8/2016 | Ahuja et al. | |
| D767,624 S | 9/2016 | Lee et al. | |
| D768,152 S | 10/2016 | Gutierrez et al. | |
| D769,270 S | 10/2016 | Hazam et al. | |
| 9,477,949 B2 | 10/2016 | Myka et al. | |
| D770,476 S | 11/2016 | Jitkoff et al. | |
| D771,116 S | 11/2016 | Dellinger et al. | |
| 9,514,327 B2 | 12/2016 | Ford | |
| D776,683 S | 1/2017 | Gobinski et al. | |
| D777,177 S | 1/2017 | Chen et al. | |
| D779,514 S | 2/2017 | Baris et al. | |
| D782,526 S | 3/2017 | Rind et al. | |
| D785,022 S | 4/2017 | Vazquez et al. | |
| D786,280 S | 5/2017 | Ma | |
| D786,896 S | 5/2017 | Kim et al. | |
| D788,123 S | 5/2017 | Shan et al. | |
| D788,128 S | 5/2017 | Wada | |
| D788,792 S | 6/2017 | Alessandri et al. | |
| 9,727,871 B2 | 8/2017 | Allin et al. | |
| D798,886 S | 10/2017 | Prophete et al. | |
| D798,890 S | 10/2017 | Nazarof et al. | |
| D800,742 S | 10/2017 | Rhodes | |
| D800,744 S | 10/2017 | Jitkoff et al. | |
| D803,235 S | 11/2017 | Markson et al. | |
| D803,846 S | 11/2017 | Gaur et al. | |
| D805,525 S | 12/2017 | Dascola et al. | |
| D806,108 S | 12/2017 | Day | |
| D807,900 S | 1/2018 | Raji et al. | |
| D808,981 S | 1/2018 | Hazam et al. | |
| 9,971,979 B2 | 5/2018 | Hakim | |
| D822,042 S | 7/2018 | Pinzon Garcia et al. | |
| D822,678 S | 7/2018 | Wu et al. | |
| D823,326 S | 7/2018 | Pinzon Garcia et al. | |
| D823,860 S | 7/2018 | Wiffen et al. | |
| D826,962 S | 8/2018 | Reece et al. | |
| 10,042,016 B2 | 8/2018 | Hanada et al. | |
| D828,851 S | 9/2018 | Kolbenheyer | |
| D830,382 S | 10/2018 | Marohn | |
| D830,403 S | 10/2018 | Subash | |
| D833,459 S | 11/2018 | Blechschmidt et al. | |
| D834,605 S | 11/2018 | Blechschmidt et al. | |
| 10,140,467 B1 | 11/2018 | Xu et al. | |
| D839,290 S | 1/2019 | Blaas et al. | |
| D839,296 S | 1/2019 | Sanchez et al. | |
| 10,182,016 B2 | 1/2019 | Birke et al. | |
| D841,017 S | 2/2019 | Bathla | |
| D841,043 S | 2/2019 | Reece et al. | |
| 10,242,017 B2 | 3/2019 | Berthiaume et al. | |
| 10,272,015 B2 | 4/2019 | Bonderer et al. | |
| D849,014 S | 5/2019 | Senders | |
| D853,412 S | 7/2019 | Hofner et al. | |
| D854,030 S | 7/2019 | Dascola et al. | |
| D857,028 S | 8/2019 | Raji et al. | |
| D857,735 S | 8/2019 | Ferrante et al. | |
| D858,545 S | 9/2019 | Hazam et al. | |
| D859,442 S | 9/2019 | Zhang et al. | |
| D873,289 S | 1/2020 | Roche, Jr. et al. | |
| D875,773 S | 2/2020 | Farh et al. | |
| D888,739 S | 6/2020 | Christiana et al. | |
| D905,734 S | 12/2020 | Christiana et al. | |
| D906,358 S | 12/2020 | Christiana et al. | |
| 2003/0014341 A1 | 1/2003 | Kamada et al. | |
| 2005/0251500 A1 | 11/2005 | Vahalia et al. | |
| 2007/0282951 A1 | 12/2007 | Selimis et al. | |
| 2010/0005411 A1 | 1/2010 | Duncker et al. | |
| 2010/0305997 A1 | 12/2010 | Ananian et al. | |
| 2011/0145128 A1 | 6/2011 | Hukkawala et al. | |
| 2011/0209193 A1 | 8/2011 | Kennedy | |
| 2011/0251942 A1 | 10/2011 | Rosenthal et al. | |
| 2012/0194558 A1 | 8/2012 | Dykes et al. | |
| 2013/0218829 A1* | 8/2013 | Martinez | G06Q 10/10 707/608 |
| 2013/0246334 A1 | 9/2013 | Ahuja et al. | |
| 2014/0136407 A1 | 5/2014 | Hazam et al. | |
| 2014/0281967 A1 | 9/2014 | Bodnick et al. | |
| 2015/0163206 A1 | 6/2015 | McCarthy et al. | |
| 2016/0343072 A1 | 11/2016 | Mohnot | |
| 2017/0041296 A1 | 2/2017 | Ford et al. | |
| 2017/0041796 A1* | 2/2017 | Spiegel | H04W 12/068 |
| 2017/0046807 A1 | 2/2017 | Ford | |
| 2017/0048285 A1 | 2/2017 | Pearl et al. | |
| 2017/0093870 A1 | 3/2017 | Meyer | |
| 2017/0201527 A1 | 7/2017 | Bedi | |
| 2017/0249682 A1 | 8/2017 | Friedman et al. | |
| 2017/0272458 A1 | 9/2017 | Muddu et al. | |
| 2017/0358041 A1 | 12/2017 | Forbes, Jr. et al. | |
| 2018/0011461 A1 | 1/2018 | Camarasa et al. | |
| 2018/0158142 A1 | 6/2018 | Gunther | |

FOREIGN PATENT DOCUMENTS

| | | |
|---|---|---|
| CN | 101689188 | 3/2010 |
| CN | 105340240 | 2/2016 |
| CN | 106230973 | 12/2016 |
| CN | 107438840 | 12/2017 |
| JP | 5710869 | 3/2011 |
| KR | 20140111190 | 9/2014 |
| KR | 101722425 | 4/2017 |
| KR | 10-2021-0008142 | 1/2021 |

OTHER PUBLICATIONS

China Office Action dated Nov. 25, 2021 in related application 201980044729.X filed Jun. 7, 2019 (16 pages).

Cognizant 20-20 Insights, Efficient client onboarding: the key to empowering banks https://www.cognizant.com/insightsWhitepapers/Efficient-Client-Onboarding-The-Key-to-Empowering-Banks.pdf, Feb. 2013 (9 pages).

Dimitrov, Dashboard for a Shopping System, dribbble.com, published on Jan. 22, 2015, retrieved from the Internet https://dribbble.com/shots/1895119-Dashboard-For-a-Shopping-System, 2015 (3 pages).

Europe Office Action dated Feb. 2, 2022 in related application 19815057.5 filed Jun. 7, 2019 (8 pages).

International Search Report and Written Opinion dated Jul. 29, 2019 in related Int'l. Application No. PCT/US19/46033 filed Jun. 7, 2019 (5 pages).

Kumar, Restaurant Admin Dashboard, retrieved on Jun. 20, 2019 from the Internet, https://dribbble.com/shots/5539174-Restaurant-Admin-Dashboard, 2018 (3 pages).

Pega onboarding solutions for Financial Services, downloaded from Internet Dec. 2018, https://www1.pega.com/industries/financial-services/onboarding (15 pages).

Reckon, Become a Reckon One Cloud Advisory, last updated on Sep. 14, 2016, [retrieved on Jun. 20, 2019], retrieved from the

(56) References Cited

OTHER PUBLICATIONS

Internet https://www.icb.org.au/Resources/Software/Become-a-Reckon-One-Cloud-Advisor, 2016 (2 pages).
Spinosa et al., A Uniform Resource Name URN Namespace for Sources of Law (LEX), Mar. 2014 (48 pages).
Korea Office Action dated Jan. 17, 2023 in related application 10-2021-7025696 filed Jun. 7, 2019 (15 pages).

\* cited by examiner

| | 410 | 412 | 414 | 416 |
|---|---|---|---|---|
| 398!ak@!$sdjlaks | Tag 1 | Tag 2 | Tag 3 | |
| 4315%#alksn | Tag 1 | Tag 2 | Tag 3 | Tag 4 |
| | | | | |

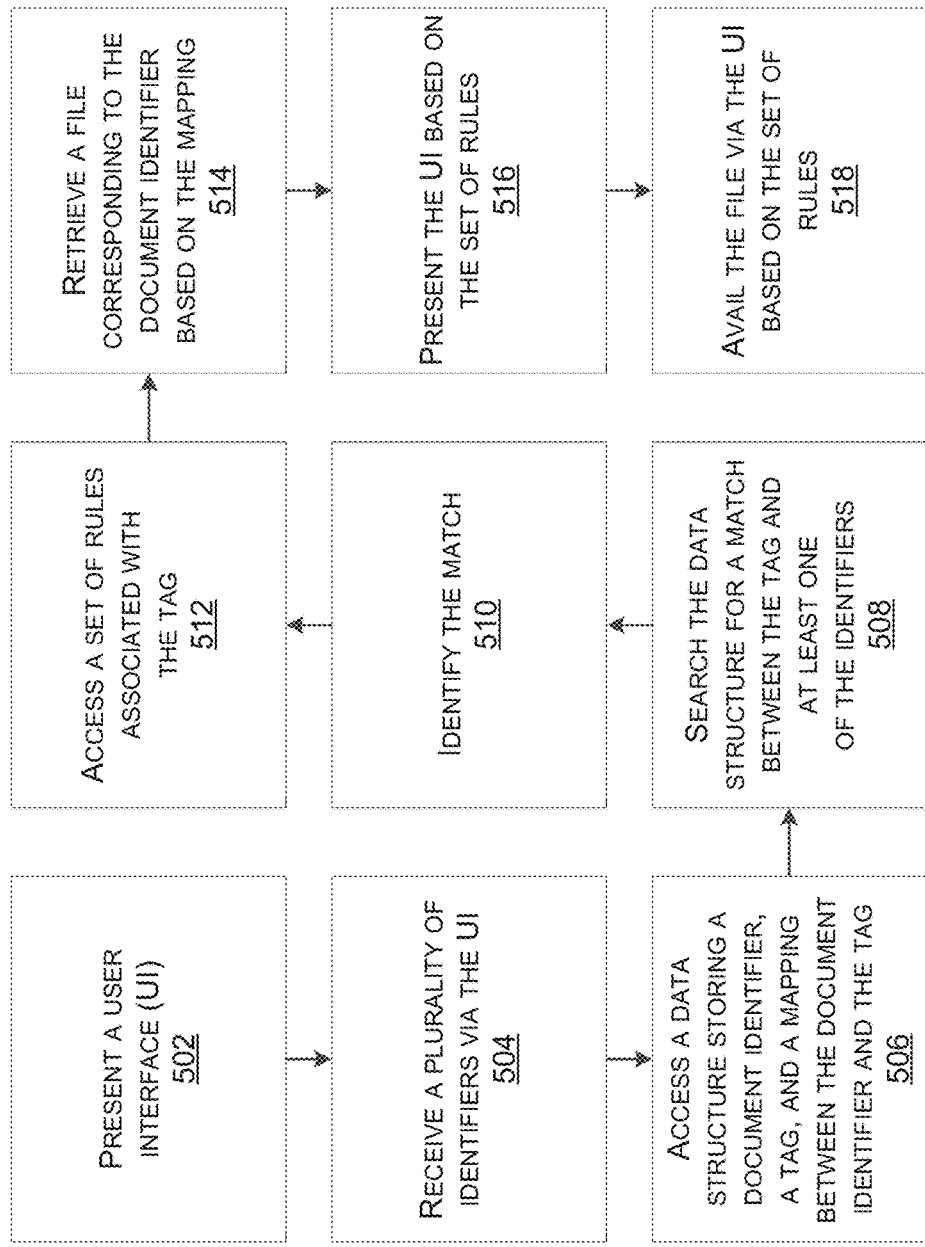

TECHNOLOGIES FOR FILE SHARING

This patent application is a Continuation of U.S. patent application Ser. No. 16/953,830 filed 20 Nov. 2020; which is a Continuation of U.S. patent application Ser. No. 16/501,110 filed 8 Jun. 2018, now U.S. Pat. No. 10,846,268 issued 24 Nov. 2020; each of which is incorporated by reference herein for all purposes.

TECHNICAL FIELD

This disclosure relates to file sharing.

BACKGROUND

Various network-based file sharing services, whether peer-to-peer (P2P) or cloud-based, enable users to share files with each other. For example, some of such services include Napster, BitTorrent, Dropbox, Box, Egnyte, Google Drive, Microsoft OneDrive, Microsoft SharePoint, Microsoft Teams, Slack, Apple iCloud, and others. Although these services are popular for use in many situations, there are some situations when these services are inadequate. In particular, these services are unable to share various files securely and selectively between various predefined user groups based on various predefined workflows. For example, in document onboarding situations, where document permissioning is important for various workflow situations, most users end up searching multitudes of emails and file directories, whether local or cloud-based, for relevant documents, which is laborious, costly, insecure, and time-consuming.

SUMMARY

In an embodiment, there is provided a method comprising: serving, via a server, a user interface to a first application running on a first client, wherein the user interface is configured to receive a first entity identifier, a second entity identifier, an action identifier, and a selection of a file; receiving, via the server, the first entity identifier, the second entity identifier, and the action identifier from the first application; receiving, via the server, a copy of the file based on the selection; generating, via the server, a task identifier, a data structure, and a document identifier; grouping, via the server, the data structure with the task identifier; populating, via the server, the data structure with the document identifier, the first entity identifier, the second entity identifier, and the action identifier such that the document identifier maps onto the first entity identifier, the second entity identifier, and the action identifier; hosting, via the server, a session with a second application running on a second client, wherein the session is associated with the second entity identifier and the action identifier; associating, via the server, the second application with the task identifier during the session based on the second entity identifier associated with the session and the action identifier associated with the session matching the second entity identifier in the data structure and the action identifier in the data structure; and sharing, via the server, the copy with the second application during the session based on the task identifier such that the copy is retrievable via the second application based on the document identifier in the data structure.

DESCRIPTION OF DRAWINGS

FIG. 4 shows a schematic diagram of an embodiment of a data structure storing a document identifier and a plurality of tags according to this disclosure.

FIG. 5 shows a flowchart of an embodiment of a process for receiving access to a file according to this disclosure.

FIGS. 12-22 show a plurality of screenshots of an embodiment of a user interface operating based on a data structure storing a mapping between a document identifier and a plurality of tags according to this disclosure.

Figure 23I:
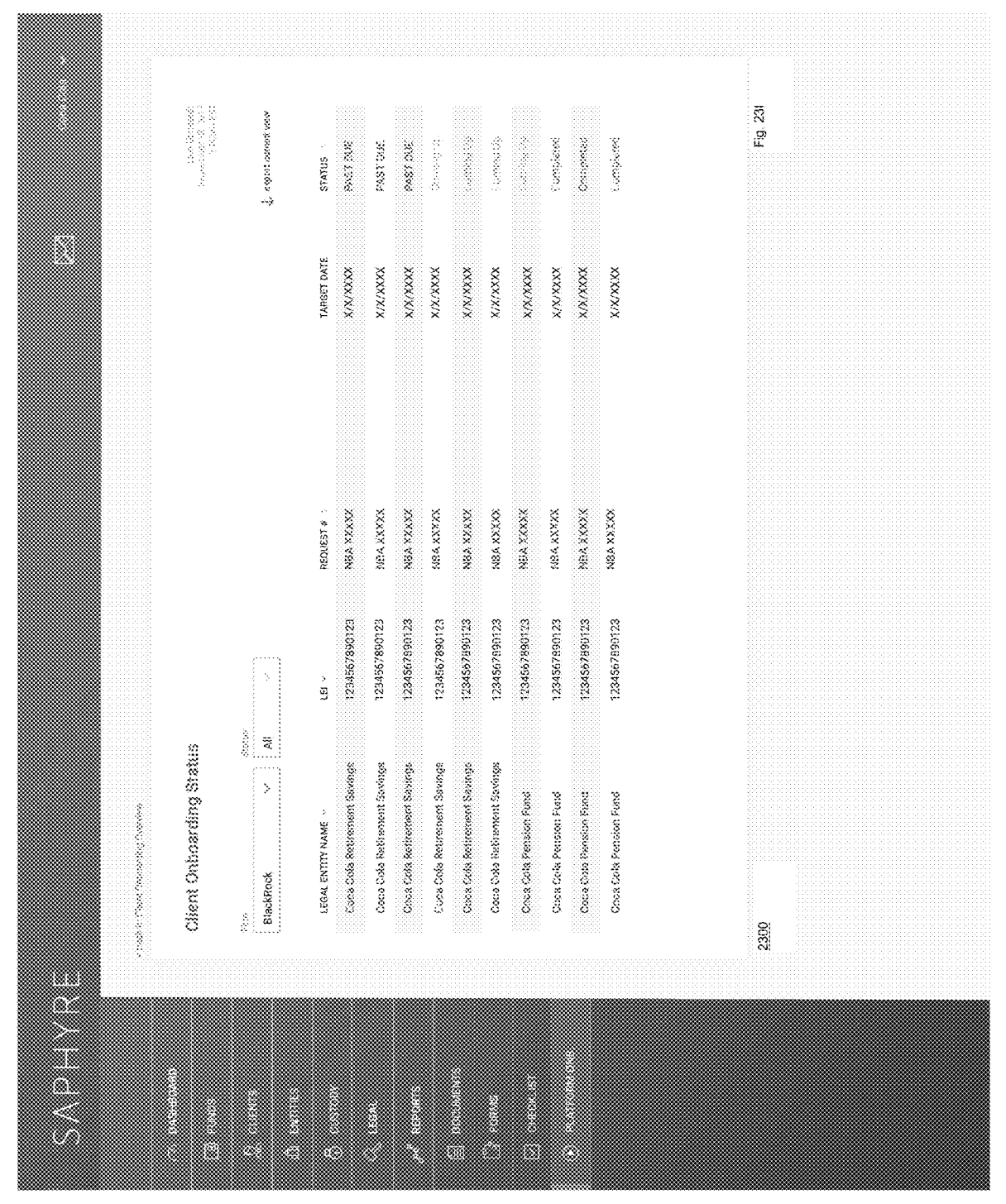

FIGS. 23A-23I show a plurality of screenshots of an embodiment of a multi-user sharing technique according to this disclosure.

DETAILED DESCRIPTION OF PREFERRED EMBODIMENTS

Figure 1:
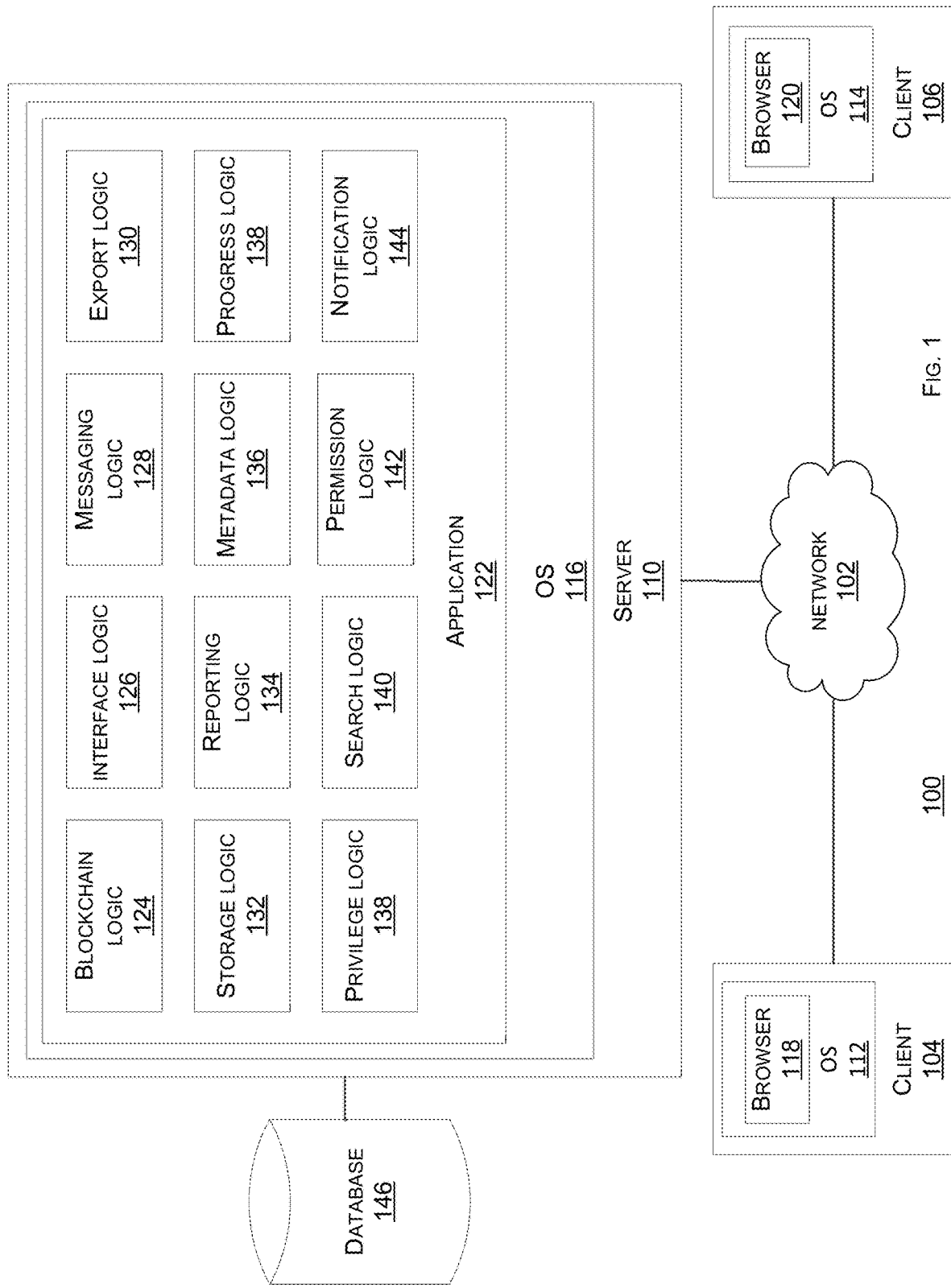
FIG. 1 shows a schematic diagram of an embodiment of a network topology according to this disclosure.

Generally, this disclosure enables various computing technologies for sharing various files securely and selectively between various predefined user groups based on various predefined workflows. For each of the predefined workflows, the files are shared based on a data structure storing various document identifiers and various metadata tags, with the document identifiers mapping onto the metadata tags. As such, these computing technologies can be used in various situations, such as onboarding or others in many fields, such as finance, accounting, legal, law enforcement, military, intelligence, education, manufacturing, medicine, pre-trade client onboarding, or others. This disclosure is now described more fully with reference to FIGS. 1-23I, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

FIG. 1 shows a schematic diagram of an embodiment of a network topology according to this disclosure. In particular, a network topology 100 is implemented in logic, whether hardware-based or software-based, on a component basis. For example, when the logic is hardware-based, then such logic can comprise circuitry, such as processors, memory, input devices, output devices, or other hardware, that is configured, such as via programming or design, to implement a functionality of a respective component. Likewise, when the logic is software-based, then such logic can comprise an instruction, such as an assembly code, a machine code, an object code, a source code, or any other type of instructions, which when executed, such as via running or compilation, implement a functionality of a respective component. Also, note that at least one component of the network topology 100 can be implemented as a service. Moreover, note that at least two components of the network topology 100 can be hosted on one computing system/hardware/device or each be distinctly hosted.

The network topology 100 is based on a distributed network operation model which allocates tasks/workloads between servers, which provide a resource/service, and clients, which request the resource/service. The servers and the clients illustrate different computers/applications, but in some embodiments, the servers and the clients reside in or are one system/device/framework/platform/application. Further, in some embodiments, the topology 100 entails allocating a large number of resources to a small number of computers, where complexity of the clients depends on how much computation is offloaded to the small number of computers, i.e., more computation offloaded from the clients onto the servers leads to lighter clients, such as being more reliant on network sources and less reliant on local computing resources. Note that other computing models are possible as well. For example, such models can comprise decentralized computing, such as a P2P system, for instance BitTorrent, or distributed computing, such as via a computer cluster where a set of networked computers works together such that the computer can be viewed as a single system.

The network topology 100 includes a network 102, a client 104, a client 106, a server 110, and a database 146. The client 104 hosts an operating system (OS) 112 and a browser 118 running on the OS 112. The client 106 hosts an OS 114 and a browser 120 running on the OS 114. The server 110 hosts an OS 116 and an application 122 running on the OS 116. The application 122 hosts a blockchain logic 124, an interface logic 126, a messaging logic 128, an export logic 130, a storage logic 132, a reporting logic 134, a metadata logic 136, a progress logic 138, a privilege logic 138, a search logic 140, a permission logic 142, and a notification logic 144, any one of which can be a module, an object, a routine, a script, a library, or others.

The network 102 includes a plurality of nodes, such as a collection of computers or other hardware interconnected via a plurality of communication channels, which allow for sharing of resources or information. Such interconnection can be direct or indirect. The network 102 can be wired or wireless. The network 102 can allow for communication over short or long distances, whether encrypted or unencrypted. The network 102 can operate via at least one network protocol, such as Ethernet, a Transmission Control Protocol (TCP)/Internet Protocol (IP), and so forth. The network 102 can have any scale, such as a personal area network (PAN), a local area network (LAN), a home area network, a storage area network (SAN), a campus area network, a backbone network, a metropolitan area network, a wide area network (WAN), an enterprise private network, a virtual private network (VPN), a virtual network, a satellite network, a computer cloud network, an internetwork, a cellular network, and so forth. The network 102 can be or include an intranet or an extranet. The network 102 can be or include Internet. The network 102 can include other networks or allow for communication with other networks, whether sub-networks or distinct networks, whether identical or different from the network 102 in structure or operation. The network 102 can include hardware, such as a computer, a network interface card, a repeater, a hub, a bridge, a switch, an extender, an antenna, or a firewall, whether hardware based or software based. The network 102 can be operated, directly or indirectly, by or on behalf of an entity or an actor, irrespective of any relation to any contents of this disclosure.

The clients 104, 106 can be embodied as a terminal, a kiosk, a workstation, a vehicle, whether land, marine, or aerial, a desktop, a laptop, a tablet, a mobile phone, a mainframe, a supercomputer, a server farm, and so forth.

The clients 104, 106 can include or be coupled to an input device, such as a mouse, a keyboard, a camera, whether forward-facing or back-facing, an accelerometer, a touchscreen, a biometric reader, a clicker, a microphone, or any other suitable input device. The clients 104, 106 can include or be coupled to an output device, such as a display, a speaker, a headphone, a joystick, a printer, or any other suitable output device. In some embodiments, the input device and the output device can be embodied in one unit, such as a touch-enabled display, which can be haptic. The OSs 112, 114 can be any type of an OS, such as MacOS, Windows, Android, Unix, Linux, or others. The browsers 118, 120 can be any type of a browser, such as Internet Explorer, Mozilla Firefox, Google Chrome, Apple Safari, Microsoft Edge, Amazon Silk, or others. Note that the OSs 112, 114 can run other applications, which can be used in accordance with this disclosure. Some examples of such applications include a productivity application, such as Microsoft Word, Microsoft Excel, Adobe Acrobat, or others, a directory navigation application, such as Windows Explorer, MacOS Finder, a command prompt, or others, whether a directory is local to or remote from the OSs 112, 114. The clients 104, 106 are in communication with the network 102, such as via the browsers 118, 120, or with the server 110 through the network 110, such as via the browsers 118, 120. In some embodiments, the clients 104, 106 are in communication with the server 110 directly, thereby bypassing the network 102. Note that more than two clients 104, 106 can be used as well, such as tens, hundreds, or thousands of clients or even more, whether identical to or different from each other in hardware or software configuration.

The server 110 can be embodied as a terminal, a kiosk, a workstation, a vehicle, whether land, marine, or aerial, a desktop, a laptop, a tablet, a mobile phone, a mainframe, a supercomputer, a server farm, and so forth. The server 110 can include or be coupled to an input device, such as a mouse, a keyboard, a camera, whether forward-facing or back-facing, an accelerometer, a touchscreen, a biometric reader, a clicker, a microphone, or any other suitable input device. The server 110 can include or be coupled to an output device, such as a display, a speaker, a headphone, a joystick, a printer, or any other suitable output device. In some embodiments, the input device and the output device can be embodied in one unit, such as a touch-enabled display, which can be haptic. The OS 116 can be any type of an OS, such as MacOS, Windows, Android, Unix, Linux, or others. The server 110 can be a single server or a plurality of servers, such as the server 110 being distributed among a web server, an application server, a database server, a virtual server, or others.

The application 112 operates as instructed via the blockchain logic 124, the interface logic 126, the messaging logic 128, the export logic 130, the storage logic 132, the reporting logic 134, the metadata logic 136, the progress logic 138, the privilege logic 138, the search logic 140, the permission logic 142, and the notification logic 144. In some embodiments, at least one of the blockchain logic 124, the interface logic 126, the messaging logic 128, the export logic 130, the storage logic 132, the reporting logic 134, the metadata logic 136, the progress logic 138, the privilege logic 138, the search logic 140, the permission logic 142, or the notification logic 144 is external to at least one of the application 112, the OS 116, or the server 110. Moreover, at least two of the blockchain logic 124, the interface logic 126, the messaging logic 128, the export logic 130, the storage logic 132, the reporting logic 134, the metadata logic 136, the progress logic 138, the privilege logic 138, the search logic 140, the permission logic 142, and the notification logic 144 can be a single logic. Further, note that although the application 112 is modular with respect to the blockchain logic 124, the interface logic 126, the messaging logic 128, the export logic 130, the storage logic 132, the reporting logic 134, the metadata logic 136, the progress logic 138, the privilege logic 138, the search logic 140, the permission logic 142, and the notification logic 144, the application 112 can be non-modular, such as objected oriented, monolithic, or others.

The database 146 is hosted off the server 110. In some embodiments, the server 110 hosts the database 146, whether internal to the application 122 or external to the application 122, such as via the OS 116. The database 146 is configured for various database operations, such as creating records, modifying records, retrieving records, searching records, identifying records, deleting records, sorting records, or others, in whole or in part. For example, some of various database input (I)/output (O) operations include reading, writing, editing, deleting, updating, searching, selecting, merging, sorting, erasing, formatting, or others. The database 146 stores data, whether in a raw state, a formatted state, an organized stated, or any other accessible state, and allows access to such data, whether directly and/or indirectly. The database 146 can be a single database or a plurality of databases, whether hosted on a single machine or a plurality of machines, whether in a single data center or distributed among a plurality of data centers. The database 146 can comprise at least one of a relational database, a non-relational database, a post-relational database, an in-memory database, a hybrid database, an Extensible Markup Language (XML) database, a parallel database, a distributed database, a graph database, a mobile database, an operation database, a probabilistic database, a real-time database, a spatial database, a temporal database, an object-oriented database, an unstructured data database, a terminology oriented database, or others.

In one mode of operation, as further explained below, the network 100 topology is configured to perform a technique for sharing various files securely and selectively between various predefined user groups based on various predefined workflows. For each of the predefined workflows, the files are shared based on a data structure storing various document identifiers and various metadata tags, with the document identifiers mapping onto the metadata tags.

Figure 2:
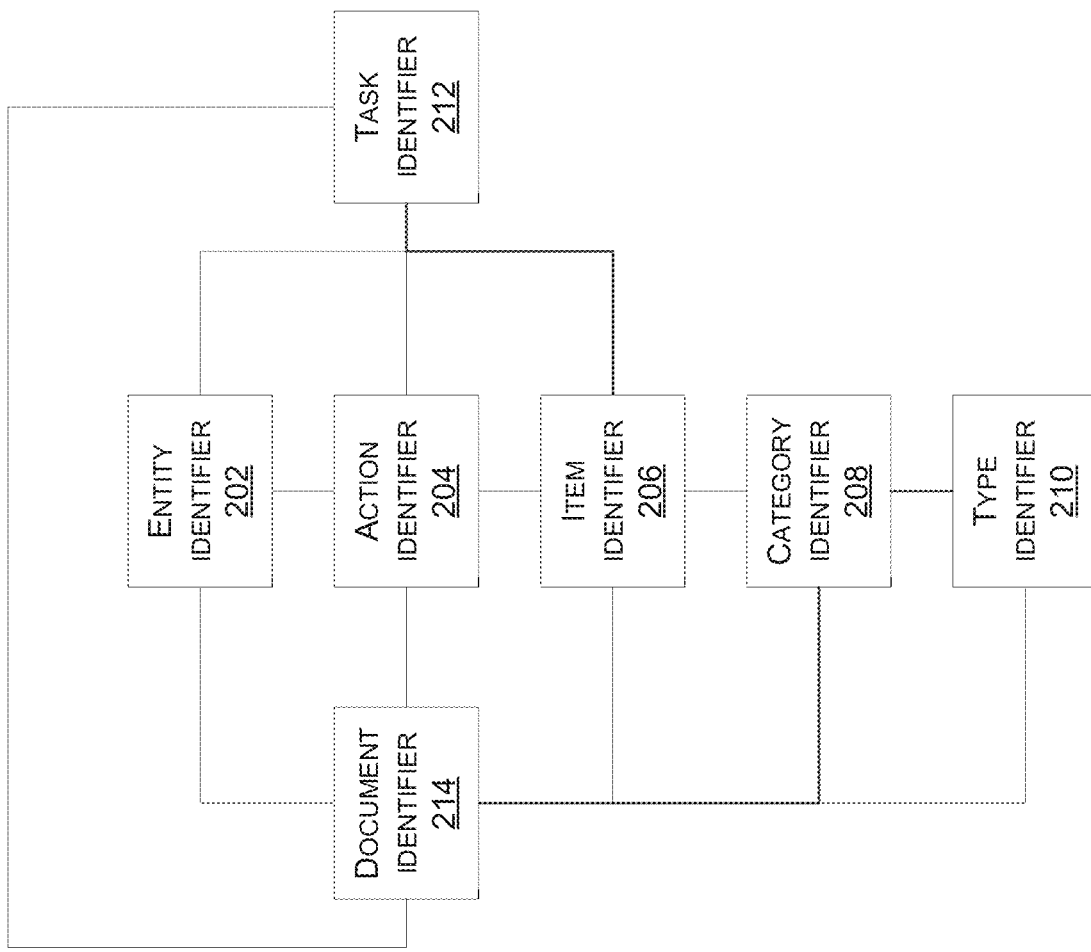
FIG. 2 shows a schematic diagram of an embodiment of a data organization according to this disclosure.

FIG. 2 shows a schematic diagram of an embodiment of a data organization according to this disclosure. In order to share various files securely and selectively between various predefined user groups based on various predefined workflows, as further described below, the application 122 maintains or operates based on a data organization in accordance with a schema 200. In particular, the schema 200 includes an entity identifier 202, an action identifier 204, an item identifier 206, a category identifier 208, a type identifier 210, a task identifier 212, and a document identifier 214. Each of the entity identifier 202, the action identifier 204, the item identifier 206, the category identifier 208, the type identifier 210, the task identifier 212, and the document identifier 214 includes a set, a sequence, a term, a collection, a group, a string, or other informational unit of alphabetic, numeric, alphanumeric, glyphic, barcode, pictorial symbols or marks or any other informational form in any other organizational arrangement. Note that punctuation symbols or marks can be included. Each of the entity identifier 202, the action identifier 204, the item identifier 206, the category identifier 208, the type identifier 210, the task identifier 212, and the document identifier 214 can be generated in accordance with a predefined format, such as an International Standards Organization (ISO) format or others, or a combination of formats, such as a plurality of ISO formats, or randomly generated. Each of the entity identifier 202, the action identifier 204, the item identifier 206, the category identifier 208, the type identifier 210, the task identifier 212, and the document identifier 214 can be unique with respect to the application 122, with respect to each other, or with respect to that particular identifier collection or identifier type or identifier format.

The schema 200 includes a logical format as indicated by a plurality of lines between the entity identifier 202, the action identifier 204, the item identifier 206, the category identifier 208, the type identifier 210, the task identifier 212, and the document identifier 214. In particular, according to the logical format, the entity identifier 202 is hierarchically related to the action identifier 204 such that the entity identifier 202 is in a one-to-many correspondence with the action identifier 204. For example, the entity identifier 202 can hierarchically have many action identifiers 204. Further, according to the logical format, the action identifier 204 is hierarchically related to the item identifier 206 such that the action identifier 204 is in a one-to-many correspondence with the item identifier 206. For example, the action identifier 204 can hierarchically have many item identifiers 206. Moreover, according to the logical format, the item identifier 206 is hierarchically related to the category identifier 208 such that the item identifier 206 is in a one-to-many correspondence with the category identifier 208. For example, the item identifier 206 can hierarchically have many category identifiers 208. Additionally, according to the logical format, the category identifier 208 is hierarchically related to the type identifier 210 such that the category identifier 208 is in a one-to-many correspondence with the type identifier 210. For example, the category identifier 208 can hierarchically have many type identifiers 210.

Collectively, according to the logical format, the entity identifier 202, the action identifier 204, and the item identifier 206 are grouped with the task identifier 212 such the task identifier 212 is in a one-to-many correspondence with each of the entity identifier 202, the action identifier 204, and the item identifier 206. For example, the task identifier 212 can be grouped with many entity identifiers 202, many action identifiers 204, and many item identifiers 206. In some embodiments, the task identifier 212 can be grouped with at least one of the category identifier 208 or the type identifier 210 in a one-to-many correspondence. For example, the task identifier 212 can be grouped with many category identifiers 208 or many type identifiers 210. Moreover, collectively, according to the logical format, the entity identifier 202, the action identifier 204, the item identifier 206, the category identifier 208, and the type identifier 210 are grouped with the document identifier 214 such that the document identifier 214 is in a one-to-many correspondence with each of the entity identifier 202, the action identifier 204, the item identifier 206, the category identifier 208, and the type identifier 210. For example, the document identifier 214 can be grouped with many entity identifiers 202, many action identifiers 204, many item identifiers 206, many category identifiers 208, and many type identifiers 210. Also, collectively, according to the logical format, the task identifier 212 is grouped with the document identifier 214 in a one-to-many correspondence. For example, the task identifier 212 can be grouped with many document identifiers 214.

The entity identifier 202 corresponds to a group of users operating the clients 104, 106. For example, the entity identifier 202 can correspond to a group containing a user A and a user B, where the user A corresponds to the client 104 and the user B corresponds to the client 106. Therefore, the privilege logic 138 enables the application 122 to distinguish between various groups of users based on the entity identifier 202. For example, if the entity identifier 202 corresponds an organization, then various employees of that organization who operate the clients 104, 106 are a group of users. For example, the entity identifier can include a legal entity identifier (LEI), such as defined via an ISO standard 17442 where the LEI includes a 20-character alphanumeric string, with a sequence of first four characters identifying a Local Operating Unit (LOU) that issued the LEI, characters five and six are reserved as '00', characters seven-eighteen are a unique alphanumeric string assigned to an entity by the LOU, and final two characters are checksum digits.

The action identifier 204 corresponds to an action that is associated with the entity identifier 202. The action identifier 204 can be dependent on or hard coded to depend on the entity identifier 202 as input. For example, in context of finance, the action identifier 204 can be a new fund launch or NFL or others. Therefore, if the entity identifier 202 includes an LEI, then the action identifier 204 can include a string NFL, where the entity identifier 202 corresponds to the action identifier 204 in a one-to-many correspondence.

The item identifier 206 corresponds to an item that is associated with the action identifier 204. The item identifier 206 can be dependent on or hard coded to depend on the action identifier 204 as input. For example, in context of finance, the item identifier 206 can be a fund identifier or fund ID or FID or others. Therefore, if the entity identifier 202 includes an LEI and the action identifier 204 includes a string NFL, where the entity identifier 202 corresponds to the action identifier 204 in a one-to-many correspondence, then the item identifier 206 can include a string FID, where the action identifier 204 corresponds to the item identifier 206 in a one-to-many correspondence.

The category identifier 208 corresponds to a product that is associated with the item identifier 206. The item identifier 208 can be dependent on or hard coded to depend on the item identifier 206 as input. For example, in context of finance, the category identifier 208 can be a product identifier or product ID or PID or others. Therefore, if the entity identifier 202 includes an LEI and the action identifier 204 includes a string NFL, where the entity identifier 202 corresponds to the action identifier 204 in a one-to-many correspondence, and the item identifier 206 can include a string FID, where the action identifier 204 corresponds to the item identifier 206 in a one-to-many correspondence, then the category identifier 208 can include a string PID, where the item identifier 206 corresponds to the category identifier 208 in a one-to-many correspondence.

The type identifier 210 corresponds a document type that is associated with the category identifier 208 and a file that will be shared, as further explained below. The type identifier 210 can be dependent on or hard coded to depend on the category identifier 208. For example, in context of finance, the type identifier 210 can be a string an International Swaps and Derivatives Association (ISDA) agreement or ISDAA or others. Therefore, if the entity identifier 202 includes an LEI and the action identifier 204 includes a string NFL, where the entity identifier 202 corresponds to the action identifier 204 in a one-to-many correspondence, and the item identifier 206 can include a string FID, where the action identifier 204 corresponds to the item identifier 206 in a one-to-many correspondence, and the category identifier 208 can include a string PID, where the item identifier 206 corresponds to the category identifier 208 in a one-to-many correspondence, then the type identifier 210 can include a string ISDAA, where the category identifier 208 corresponds to the type identifier 210 in a one-to-many correspondence.

The task identifier 212 corresponds to a task based on which a file will be shared, as further described below. The task identifier 212 can be generated based at least one of the entity identifier, the action identifier 204, or the item identifier 206. For example, in context of finance, the task identifier 212 can be a string a new fund launch 41 or NFL000041 or others. Therefore, if the entity identifier 202 includes an LEI and the action identifier 204 includes a string NFL, where the entity identifier 202 corresponds to the action identifier 204 in a one-to-many correspondence, and the item identifier 206 can include a string FID, where the action identifier 204 corresponds to the item identifier 206 in a one-to-many correspondence, and the category identifier 208 can include a string PID, where the item identifier 206 corresponds to the category identifier 208 in a one-to-many correspondence, and the type identifier 210 can include a string ISDAA, where the category identifier 208 corresponds to the type identifier 210 in a one-to-many correspondence, then the task identifier 212 can be NFL000041 to which each of the entity identifier 202, the action identifier 204, and the item identifier 206 correspond in a many-to-one correspondence. For example, many entity identifiers 202 can correspond to the task identifier 212 NFL000041, many action identifiers 204 can correspond to the task identifier 212 NFL000041, and many item identifiers can correspond to the task identifier 212 NFL000041.

The document identifier 214 corresponds to a file that is being shared. The document identifier 214 can be generated based on a content of the file, such as a document text or a pattern within the file, or a characteristic of the file, such as a file name, a read or last-accessed or modified or created date or time stamp, a file size, or neither, such as randomly, or others. For example, the document identifier 214 can include a string AK24!%asfLm@$1fa or others.

Therefore, if the entity identifier 202 includes an LEI and the action identifier 204 includes a string NFL, where the entity identifier 202 corresponds to the action identifier 204 in a one-to-many correspondence, and the item identifier 206 can include a string FID, where the action identifier 204 corresponds to the item identifier 206 in a one-to-many correspondence, and the category identifier 208 can include a string PID, where the item identifier 206 corresponds to the category identifier 208 in a one-to-many correspondence, and the type identifier 210 can include a string ISDAA, where the category identifier 208 corresponds to the type identifier 210 in a one-to-many correspondence, and the task identifier 212 can be NFL000041 to which each of the entity identifier 202, the action identifier 204, and the item identifier 206 correspond in a many-to-one correspondence, and the category identifier 208, then the document identifier 214 AK24!%asfLm@$1fa can correspond to each of the entity identifier 202, the action identifier 204, the item identifier 206, the category identifier 208, the type identifier 210, and the task identifier 212 in a many-to-one correspondence. For example, many document identifiers 214 to the entity identifier 202, many document identifiers 214 can correspond to the action identifier 204, many document identifiers 214 can correspond to the item identifier 206, many document identifiers 214 can correspond to the category identifier 208, many document identifiers 214 can correspond to the type identifier 210, and many document identifiers 214 can correspond to the task identifier 212.

Figure 3:
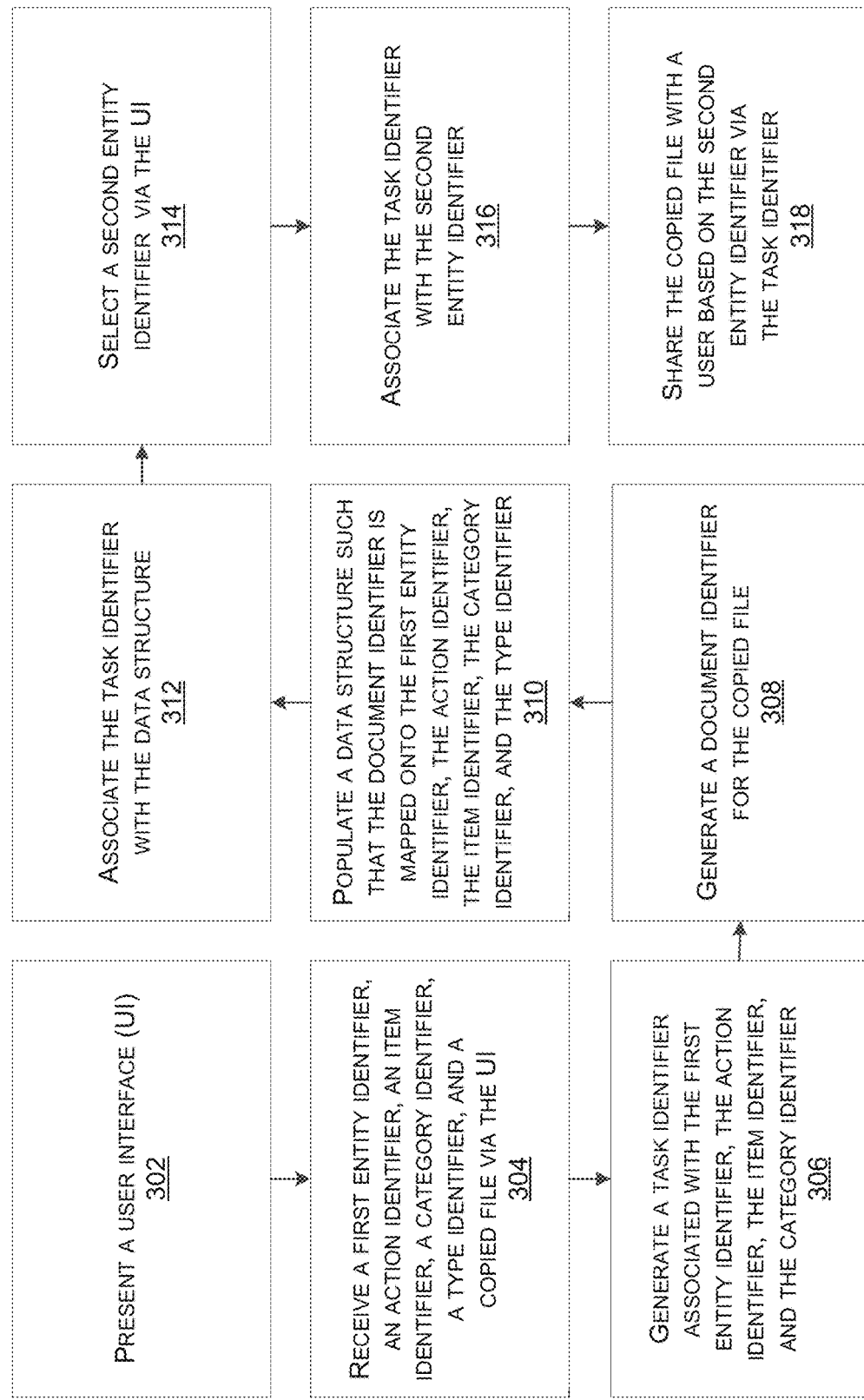
FIG. 3 shows a flowchart of an embodiment of a process for granting access to a copied file according to this disclosure.

FIG. 3 shows a flowchart of an embodiment of a process for granting access to a copied file according to this disclosure. A process 300 is performed via the network topology 100.

In block 302, the interface logic 126 presents a graphical user interface (GUI) to the browser 118 over the network 102. The GUI depicts a set of input elements, such as a text field, a dropdown box, a radio button, a slider, or others. For example, the GUI can include a menu, a form, or questionnaire presented on at least one page, such as a webpage or others. The set of input elements are ready for user data entry, such as via an input device, such as a mouse, a keyboard, whether physical or virtual, a touchpad, a trackball, a camera, a microphone, or others. The interface logic 126 presents the GUI based on the client 104 sending the server 110 a name and a password for authentication via the privilege logic 138. For example, each of the name and the password can include an alphanumeric string, a photo, a biometric, or others. As such, the server 110 can host a session with the client 104 based on the application 122 communicating with the browser 118. Note that the session can be a secure session, such as via an hypertext transfer protocol secure (HTTPS) protocol or others.

In block 304, the interface logic 126 receives a first entity identifier, an action identifier, an item identifier, a category identifier, a type identifier, and a copied file from the browser 118. With reference to FIG. 2, the first entity identifier corresponds to the entity identifier 202, the action identifier corresponds to the action identifier 204, the item identifier corresponds to the item identifier 206, the category identifier corresponds to the category identifier 208, and the type identifier corresponds to the type identifier 210. As such, the first entity identifier can correspond to the action identifier in a one-to-many correspondence. Note that the session between the browser 118 and the application 122 can be associated with the first entity identifier and others, such as the action identifier, the item identifier, the category identifier, or others. For example, the browser 118 can login into the server 110 based on a set of user credentials belonging to or corresponding to a user group associated with the first entity identifier, such as a first user who can grant a permission for a file to a second user, where the first user is operating the browser 118, where the second user is associated with the first entity identifier or another entity identifier, where the permission can include a read permission, a write permission, or others. However, note that the session between the browser 118 and the application 122 can be non-associated with the first user identifier. For example, the browser 118 can login into the server 110 based on a set of user credentials belonging to or corresponding to a user group non-associated with the first entity identifier where a user of the browser 118 acts as a 3rd party or matchmaker between a plurality of entity identifiers inclusive of the first entity identifier. For example, in context of finance, this situation can occur between a broker (the first entity identifier) setting up an account between a client of the broker and a settlement bank of the broker.

The copied file is received from the client 104, such as whether the file was stored on the client 104 prior to copying or otherwise accessible to the client 104 or the browser 118, or from a data source remote from the client 104, such as via a network-based file sharing service, whether P2P or cloud-based, such as Napster, BitTorrent, Dropbox, Box, Egnyte, Google Drive, Microsoft OneDrive, Microsoft Sharepoint, Microsoft Teams, Slack, Apple iCloud, and others. For example, the file can be stored local to the client 104 before copying or remote from the client 104 before copying. For example, the copied file can be received from the browser 118 based on a user selection of the file prior to copying. For example, the copied file can be received from a data source, such as a network-based file sharing service, remote from the client 104 based on a user selection of the file, whether locally or remotely. Note that the copied file can be a data file, such as a productivity document file, such as a Microsoft Word file, a Microsoft Excel file, a Portable Document Format (PDF) file, an image file, a sound file, a plaintext file, a settings file, or others, whether password protected or not password protected. Likewise, note that the copied file can be an executable file, such as a .BAT file, a .COM file, a .EXE file, a .BIN file, a smart contract file, or others, whether executable in a Windows environment or other OS environments, inclusive of distributed environments. Once received, the copied file can be stored local to or remote from the server 110. For example, the copied file can be stored via the database 146, as managed via the storage logic 132. Note that the server 110 can check the copied file for viruses or other malware when receiving the copied file. If the server 110 detects the copied file to contain the virus, then the server 110 can inform the client 104 of such and delete the copied file from the server 110.

In block 306, the metadata logic 136 generates a task identifier to be associated with the first entity identifier, the action identifier, the item identifier, and the category identifier. With respect to FIG. 2, the task identifier corresponds to the task identifier 212. For example, the task identifier can be generated based on the action identifier. Accordingly, the task identifier is associated with the first entity identifier, the action identifier, the item identifier, and the category identifier based on grouping the task identifier with the first entity identifier in a one-to-many correspondence, the action identifier in a one-to-many correspondence, the item identifier in a one-to-many correspondence, and the category identifier in a one-to-many correspondence.

In block 308, the metadata logic 136 generates a document identifier for the copied file. With respect to FIG. 2, the document identifier corresponds to the document identifier 214. As explained above, the metadata logic 136 can generate the document identifier based on the content of the copied file or the characteristic of the copied file or neither, such as randomly, or others.

In block 310, the metadata logic 136 populates a data structure such that the document identifier is mapped onto the first entity identifier, the action identifier, the item identifier, the category identifier, and the type identifier. Note that the data structure can be preexisting at that time or created at that time for use via the metadata logic 136. The metadata logic 136 can populate the data structure via writing into the data structure, whether first-in-first-out (FIFO) or last-in-first-out (LIFO) or others. For example, the document identifier, the first entity identifier, the action identifier, the item identifier, the category identifier, and the type identifier can be written into the data structure such that the document identifier is mapped onto the first entity identifier, the action identifier, the item identifier, the category identifier, and the type identifier. For example, the first entity identifier, the second entity identifier, and the action identifier stored in the data structure can be or include a metadata tag. The data structure can include at least one of a table, a flat file, a vector, a tree, a linked list, a queue, a stack, a deque, a matrix, an array, a hash, a heap, a multi-map, a quad-tree, a graph, or others. When the data structure includes a database, then the database can include a relational database, an in-memory database, a no-SQL database, or others. As such, the data structure stores the document identifier mapped to each of the first entity identifier in a one-to-many correspondence, each of the action identifier in a one-to-many correspondence, each of the item identifier in a one-to-many correspondence, each of the category identifier in a one-to-many correspondence, and each of the type identifier in a one-to-many correspondence. For example, the data structure can be populated with the task identifier such that the document identifier is mapped onto the task identifier or such that the task identifier is mapped onto the document identifier.

Note that the data structure can be static or dynamic with respect to at least one of a shape thereof or a size thereof. For example, when the data structure includes a table, then the table includes a number of columns and a number of rows. As such the number of columns or the number of rows can be static or dynamic. Likewise, the data structure can store the first entity identifier, the action identifier, the item identifier, the category identifier, and the type identifier in at least one of a predefined order or a predefined cell arrangement. For example, when the data structure includes a table, then the predefined order can mandate that entity identifiers sequentially precede action identifiers and action identifiers sequentially precede item identifiers or others. For example, when the data structure includes a table, then the predefined cell arrangement can mandate that entity identifiers are populated in specified addressable cells (or columns or rows) and action identifiers are populated in specified addressable cells (or columns or rows). However, in some embodiments, the data structure does not store the first entity identifier, the action identifier, the item identifier, the category identifier, and the type identifier in at least one of a predefined order or a predefined cell arrangement.

In block 312, the metadata logic 136 associates the task identifier with the data structure. For example, such association can occur via grouping the data structure with the task identifier. For example, such association can occur via forming a hash table mapping the task identifier to the data structure, such as when the data structure has a structure identifier associated therewith and the mapping can occur via the task identifier mapping onto the structure identifier. For example, such association can occur via writing the task identifier into the data structure such that the task identifier is mapped onto the document identifier, such as in a one-to-many correspondence.

In block 314, the interface logic 126 enables the GUI presented via the browser 118 to input a second entity identifier. With reference to FIG. 2, the second entity identifier corresponds to the entity identifier 202. Note that the second entity identifier can be identical to or different from the first identifier. For example, the second entity identifier can be identical to the first entity identifier, such as when sharing within a common user group, or different from the first entity identifier, such as when sharing between different user groups. For example, the second entity identifier can be associated with the client 106. Accordingly, since the menu presents the set of input elements that are ready for user data entry, as explained above, the second entity identifier can be input via an input device of the client 104, such as a mouse, a keyboard, whether physical or virtual, a touchpad, a trackball, a camera, a microphone, or others. Note that, as explained above, the browser 118 can be associated with the first entity identifier (file sender) or a third entity identifier (matchmaker between two entity identifiers). Also, note that at least one of the first entity identifier or the second entity identifier can include a legal entity identifier, whether those identifiers are identical to or different from each other in content, format, or others. Note that the task identifier can be generated based on at least one of the first entity identifier or the second entity identifier.

In block 316, the metadata logic 136 associates the task identifier with the second entity identifier. For example, such association can occur via grouping the second entity identifier with the task identifier. Likewise, for example, such association can occur via forming a hash table mapping the task identifier to the second entity identifier. Similarly, for example, such association can occur via writing the second entity identifier into the data structure such that the document identifier is mapped onto the second entity identifier and the task identifier is mapped onto the document identifier. Note that the second entity identifier can correspond to the action identifier in a one-to-many correspondence.

In block 318, the permission logic 142 shares the copied file with a user based on the second entity identifier via the task identifier. The user can be associated with the second entity identifier (and other identifiers disclosed herein) based on the user operating the browser 120 of the client 106 and thereby hosting a session with the server 110. Note that the session can be a secure session, such as via a HTTPS protocol or others. During the session, the user inputs the second entity identifier (and other identifiers) into a GUI presented via the browser 120. The user can input the second entity identifier (and other identifiers) via an input device of the client 106, such as a mouse, a keyboard, whether physical or virtual, a touchpad, a trackball, a camera, a microphone, or others. For example, the GUI can include a menu, a form, a questionnaire, or others. Note that the GUI with which the user associated with the second entity identifier interfaces can be identical to or different from or be same one as the GUI with which the user associated with the first entity identifier interfaces.

Once the user is associated with the second entity identifier (and other identifiers disclosed herein) and the task identifier corresponds to the first entity identifier and the second entity identifier (and other identifiers disclosed herein), based on the task identifier corresponding to the first identifier and the second identifier, the permission logic 142 can share the copied file based on the document identifier. For example, the permission logic 142 can share the copied file via sending a message with a hyperlink from the user associated with the first entity identifier to the user associated with the second entity identifier such that the user associated with the second entity identifier can access the copied file via activating the hyperlink. The message can be sent and received via the messaging logic 128 and be notified of via the notification logic 144. When the link is activated, the server 110, such as via the storage logic 132, can access the task identifier corresponding to the first entity identifier and the second entity identifier (and other identifiers disclosed herein), identify the document identifier corresponding to the task identifier, retrieve the copied file from a repository based on the document identifier, and avail the copied file with the user associated with the second entity identifier. As such, the copied file can be shared with the browser 120 during the session via a presentation of a hyperlink on the browser 120, where the copied file is at least one of opened or downloaded based on an activation of the hyperlink via the browser 120 during the session.

Note that the message can include an email message, a text message, an over-the-top (OTT) message, a social networking message, or others. Further, note that the access can be a read right, a write right, or others. Moreover, note that the browser 118 can be associated with the task identifier during the session, such as via a cookie stored on the client 106 or others, based on the user associated with the second entity identifier providing an input into the browser 118, where the input can include the entity identifier, the action identifier, the item identifier, the category identifier, or others, as explained above. Similarly, for example, where the user is associated with the second entity identifier (and other identifiers), as explained above, and where the task identifier corresponds to the first entity identifier and the second entity identifier, based on the task identifier corresponding to the first entity identifier and the second entity identifier, the permission logic 142 can share the copied file via an icon corresponding to the copied file appearing within the GUI presented on the browser 120 of the client 106, where the browser 120 is associated with the user corresponding to the second entity identifier and where the copied file can be accessed via activating the icon, such as via clicking, touching, or others. When the icon is activated, the server 110 can access the task identifier corresponding to the first entity identifier and the second entity identifier (and other identifiers disclosed herein), identify the document identifier corresponding to the task identifier, retrieve the copied file from a repository based on the document identifier, and avail the copied file with the user associated with the second entity identifier. Therefore, the server 110 can associate the browser 120 with the task identifier during the session based on the second entity identifier being associated with the session, as user input, and the action identifier being associated with the session, as user input, matching the second entity identifier stored in the data structure and the action identifier stored in the data structure, as explained above. Note that the browser 120 can be associated with the task identifier during the session based on the item identifier being associated with the session and the category identifier being associated with the session matching the item identifier in the data structure and the category identifier in the data structure. Consequently, the server 110 shares the copied file with the browser 120 during the session based on the task identifier such that the copied file is retrievable via the browser 120 based on the document identifier stored in the data structure. Note that the copied file can be shared with more than two entity identifiers, such as at least three or more. For example, in context of finance, this can involve an asset manager, a fund administrator, and a custodian, as explained above. Further, note that the server 110 can deduplicate the copied file before sharing the copied file with the browser 120 during the session, as explained above. For example, the copied file can be deduplicated based on at least one of the first entity identifier, the second entity identifier, the action identifier, or the task identifier. For example, the copied file can be deduplicated based on at least the first entity identifier, the action identifier, and at least one of the task identifier or the second entity identifier. For example, the copied file can be deduplicated based on the first entity identifier, the action identifier, the task identifier, the second entity identifier, and at least one of the item identifier or the category identifier.

In some embodiments, the server 110 includes a web server, an application server, and a database server. As explained above, the web server serves the GUI on the browser 118 and receives the first entity identifier, the second entity identifier, the action identifier, and the copy. The application server generates the task identifier, the data structure, and the document identifier. The application server groups the data structure with the task identifier. The application server populates the data structure with the document identifier, the first entity identifier, the second entity identifier, and the action identifier such that the document identifier maps onto the first entity identifier, the second entity identifier, and the action identifier. The web server hosts the session with the browser 120 and the application server associates the browser 120 with the task identifier during the session based on the second entity identifier associated with the session and the action identifier associated with the session matching the second entity identifier in the data structure and the action identifier in the data structure. The application server shares the copy with the browser 120 via the database server. The database server stores the copy.

FIG. 4 shows a schematic diagram of an embodiment of a data structure storing a document identifier and a plurality of tags according to this disclosure. A data structure 400 is presented as a table having a plurality of rows 402, 404, 406 and a plurality of columns 408, 410, 412, 414, 416 thereby defining a grid with a plurality of addressable cells (fifteen as shown although more or less is possible). Each of the addressable cells stores a metadata tag corresponding to an identifier disclosed herein. As such, the row 402 stores a document identifier 3981ak@!$sdjlaks, a tag 1 (a first entity identifier), a tag 2 (a second entity identifier), a tag 3 (an action identifier). Note that the row 402 includes an empty cell, which can be populated with a tag 4. Likewise, the row 404 includes a document identifier 43!5%#alksn, a tag 1 (a first entity identifier), a tag 2 (a second entity identifier), a tag 3 (an action identifier), a tag 4 (an item identifier). Note that the row 402 and the row 404 are different in an amount of populated cells, although the row 402 and the row 404 may not differ in the amount of populated cells. As explained above, the data structure 400 can be static or dynamic with respect to at least one of a shape thereof or a size thereof. For example, the rows 402, 404, 406 or the columns 408, 410, 412, 414, 416 can be static or dynamic in number. Likewise, the data structure 400 can store a set of tags in at least one of a predefined order or a predefined cell arrangement. For example, the predefined order can mandate that entity identifiers (tag 1 and tag 2) sequentially precede action identifiers (tag 3) and action identifiers (tag 3) sequentially precede item identifiers (tag 4) or others. For example, the predefined cell arrangement can mandate that entity identifiers (tag 1 and tag 2) are populated in specified addressable cells (column 410 and column 412) and action identifiers are populated in specified addressable cells (column 414). However, in some embodiments, the data structure 400 does not store a set of tags in at least one of a predefined order or a predefined cell arrangement.

FIG. 5 shows a flowchart of an embodiment of a process for receiving access to a file according to this disclosure. A process 500 is performed via the network topology 100.

In block 502, the interface logic 126 presents a GUI to a browser, as explained above.

In block 504, the interface logic 126 receives a plurality of identifiers via the GUI, as explained above. The identifiers can include a first entity identifier, a second entity identifier, an action identifier, an item identifier, a category identifier, a type identifier, or others, as explained above.

In block 506, the permission logic 142 accesses a data structure, as explained above. The data structure stores a document identifier, a metadata tag, and a mapping between the document identifier and the metadata tag, as explained above. The document identifier can be mapped to the metadata tag in a one-to-many correspondence, as explained above. The metadata tag includes information corresponding to at least one of the identifiers. For example, such information can be stored in an alphanumeric format, a pictorial format, an audio format, barcode format, or any other symbolic or non-symbolic representation. The data structure is already associated with a task identifier, as explained above. For example, such association can occur via the task identifier being stored within the data structure and mapped onto the document identifier in a one-to-many correspondence. For example, such association can occur via the task identifier being an object stored external to the data structure and linked or related to the data structure. As such, the data structure is accessed based on the task identifier, i.e., based on the identifiers received via the GUI corresponding a plurality of identifiers pre-grouped with the task identifier.

In block 508, the search logic 140 searches the data structure for a match between the tag and at least one of the identifiers, as input. For example, when the data structure stores a plurality of metadata tags and when the browser receives a first entity identifier, a second entity identifier, an action identifier, an item identifier, a category identifier, and a type identifier the search logic 140 searches the data structure for the match between those identifiers and the tag. The search logic 140 can employ at least one of a brute force search algorithm, a linear search algorithm, a binary search algorithm, a tree search algorithm, a stochastic search algorithm a depth search algorithm, a breadth search algorithm, or others. The search logic 140 can search for the match in parallel (concurrently search for matches between the identifiers and the tags) or in series (sequentially search for matches between the identifiers and the tags).

In block 510, the search logic 140 identifies the match between the tag and at least one of the identifiers. For example, the match can be identified between the tag and at least one of the first entity identifier, the second entity identifier, the action identifier, the task identifier, the item identifier, or the category identifier.

In block 512, the permission logic 142 accesses a set of rules associated with the tag, as matched to at least one of the identifiers. The set of rules corresponds to a predefined workflow associated with that tag and to the task identifier corresponding to that tag. The set of rules can control how the GUI is presented to a user operating the browser. For example, the set of rules can control what output elements are presented and content/logic therein or therebetween or what input elements are presented and content/logic therein or therebetween. For example, the permission logic 142 can identify the set of rules corresponding to the task identifier.

In block 514, the permission logic 142 interfaces with the storage logic 132 such that the storage logic 132 retrieves a file corresponding to the document identifier based on the mapping in the data structure. For example, the document identifier can be identified and the file is retrieved. The storage logic 132 retrieves the file from the database 146. The file is retrieved via the document identifier based on the match between the tag and at least one of the identifiers for a task identifier, i.e., once the match is identified then the document identifier corresponding to that tag is identified and the file is retrieved via the document identifier.

In block 516, the interface logic 126 presents the GUI via the browser based on the set of rules. As such, the GUI can be regenerated or modified based on the set of rules. For example, various input elements and output elements are presented based on the set of rules and various corresponding content/logic is presented or coupled to the various input elements and the output elements.

In block 518, the interface logic 126 communicates with the permission logic 142 such that the file is availed via the GUI based on the set of rules, as explained above. For example, the permission logic 142 can share the file via presenting a message with a hyperlink such that the file can be accessed via activating the hyperlink or via an icon corresponding to the file appearing within the GUI and where the file can be accessed via activating the icon, such as via clicking, touching, or others.

Figure 6A:
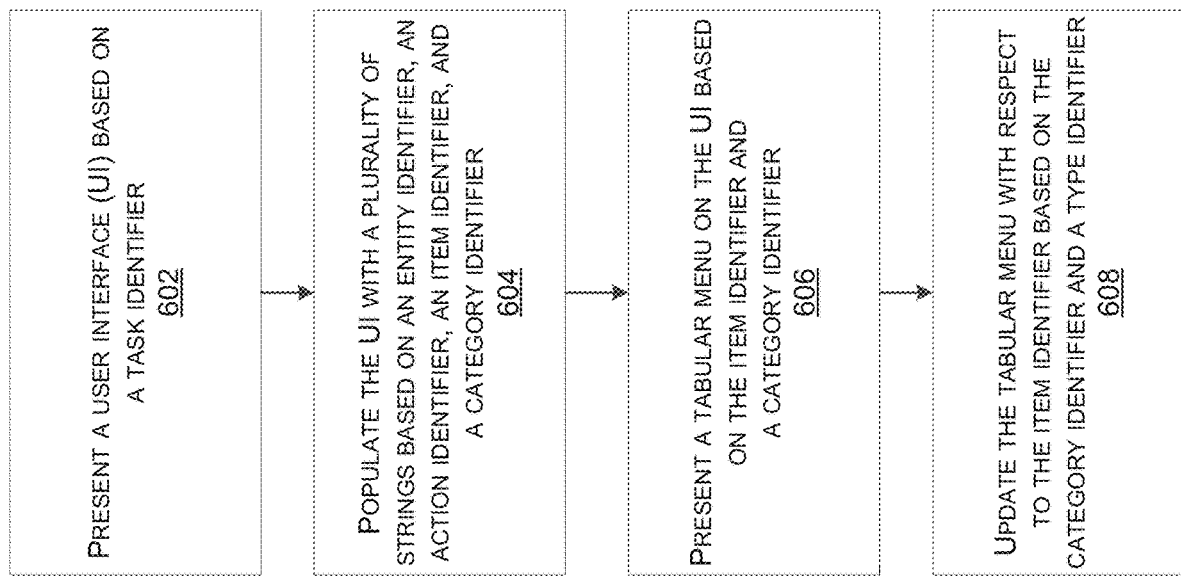
FIGS. 6A-6C show a flowchart and a pair of screenshots of an embodiment of a technique for tracking a progress against a set of rules based on a file associated with a plurality of item identifiers, a plurality of category identifiers, and a plurality of type identifiers according to this disclosure.
Figure 6B:
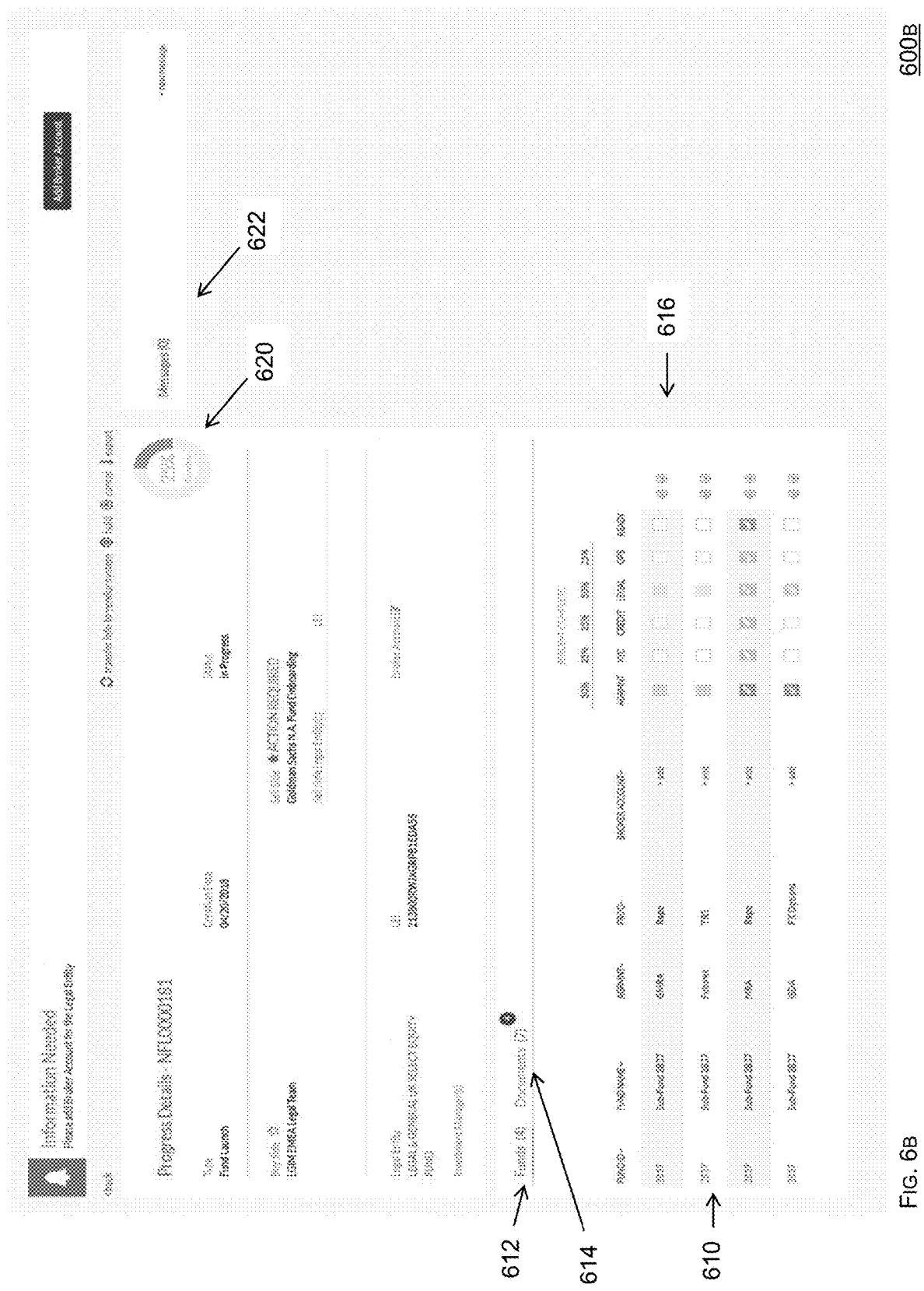
Figure 6C:
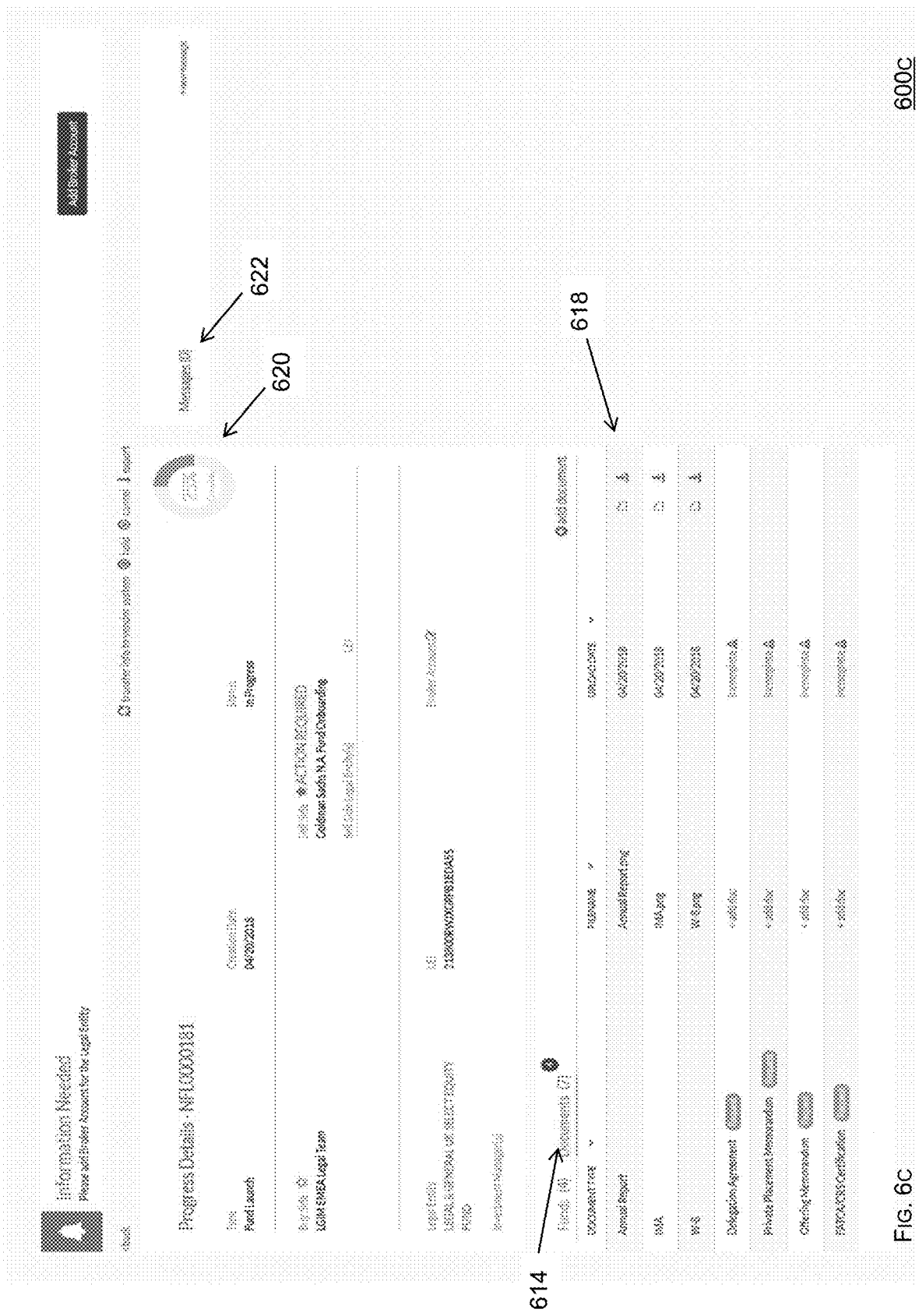

FIGS. 6A-6C show a flowchart and a pair of screenshots of an embodiment of a technique for tracking a progress against a set of rules based on a file associated with a plurality of item identifiers, a plurality of category identifiers, and a plurality of type identifiers according to this disclosure. A process 600A is performed via the network topology 100.

In block 602, the interface logic 126 presents a GUI 600B, 600C based on a task identifier, as previously formed based on a plurality of identifiers previously input via a user of a browser, as explained above. The identifiers include an entity identifier, an action identifier, a plurality of item identifiers, a plurality of category identifiers, or others. The GUI 600B, 600C depicts a first page hyperlink 612 and a second page hyperlink 614, as selectively switchable therebetween.

In block 604, the interface logic 126 populates the GUI 600B, 600C with a plurality of strings based on the entity identifier, the action identifier, the item identifiers, and the category identifiers. The strings correspond to the entity identifier, the action identifier, the item identifier, and the category identifier. For example, the strings can be labels, whether passive or active (hyperlinked), to aid in user interactivity.

In block 606, the interface logic 126 communicates with the metadata logic 136 and the progress logic 138 such that the GUI 600B presents a tabular menu 610 based on the item identifiers and the category identifiers when the first page hyperlink 612 is selected. The tabular menu 610 includes a plurality of columns and a plurality of rows thereby defining a grid containing a plurality of values corresponding to the item identifiers and the category identifiers with respect to a plurality of files stored in the database 146. In the tabular menu 610, the rows correspond to the item identifiers and the columns correspond to the category identifiers, a plurality of type identifiers, and other identifiers, as previously input, as explained above.

The tabular menu 610 also presents a checkbox based grid 616 corresponding to the item identifiers with respect the files satisfying a present or absence threshold (binary) based on the set of rules, as explained above. Note that the set of rules corresponds to the task identifier, as explained above. Also, note that the checkbox based grid 616 includes a pause button and a play button for each of the item identifiers, with the pause button pausing a progress analysis against that respective item identifier and the play button maintaining a progress analysis active against that respective item identifier. As such, for each of the item identifiers, as the files get uploaded and tagged, as explained above, the checkbox based grid 616 gets completed, as determined against the set of rules. In some embodiments, the checkbox based grid 616 can be manually updated via the browser 118 or the browser 120 in real-time so that the checkbox based grid 616 is visually updated to at least one of the browser 118 or the browser 120.

Note that the GUI 600B, 600C depicts a pie bar 620 which is dynamically updated in real-time based on the checkbox based grid 616 being completed. Note that the pie bar 620 is associated with the task identifier.

Further, note that the GUI 600B, 600C contains a messaging interface 622, as managed via the messaging logic 128 based on the task identifier. For example, the messaging interface 622 enables internal messaging communications between the browser 118 and the browser 120 based on the task identifier between the user associated with the first entity identifier and the user associated with the second entity identifier, as grouped with the task identifier. As such, the messaging logic 128 enables an internal messaging service between the browser 118 and the browser 120 during a session based on the task identifier after a copied file has been shared with the browser 120 during the session, as explained above. In some embodiments, the messaging interface 622 enables external messaging communications between the browser 118 and the browser 120 are possible.

The second page hyperlink 614 presents a tabular menu 618 that shows various category identifiers and type identifiers corresponding to the files, as uploaded and categorized with the type identifier, and not yet uploaded, as explained above. Note that the tabular menu 610 and the checkbox based grid 6161 are based on values of the tabular menu 618.

In block 608, the interface logic 126 communicates with the metadata logic 136 and the progress logic 138 such that the GUI 600B updates the tabular menu 610 with respect to the item identifiers based on the category identifiers and the type identifiers. For example, as the files get uploaded via the GUI 600C, the checkbox based grid 616 gets updated based on the set of rules corresponding to the task identifier. Therefore, the pie bar 620 is updated accordingly. As such, the server 110 can monitor a status of a degree of completion of a document set based on the set of rules and present the tabular menu 610 to the browser 118 or the browser 120 after sharing of the copied file with the browser 120 during the session, where the tabular menu 610 is configured to depict the status of the degree of completion of the document set with respect to the item identifier and the category identifier based on the set of rules.

Figure 7A:
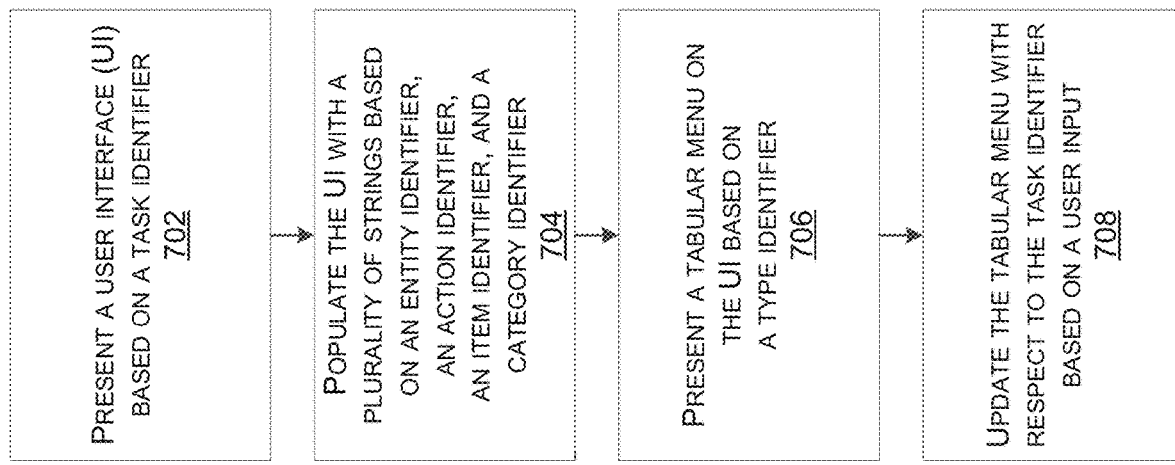
FIGS. 7A-7C show a flowchart and a pair of screenshots of an embodiment of a technique for updating a progress detail according to this disclosure.
Figure 7B:
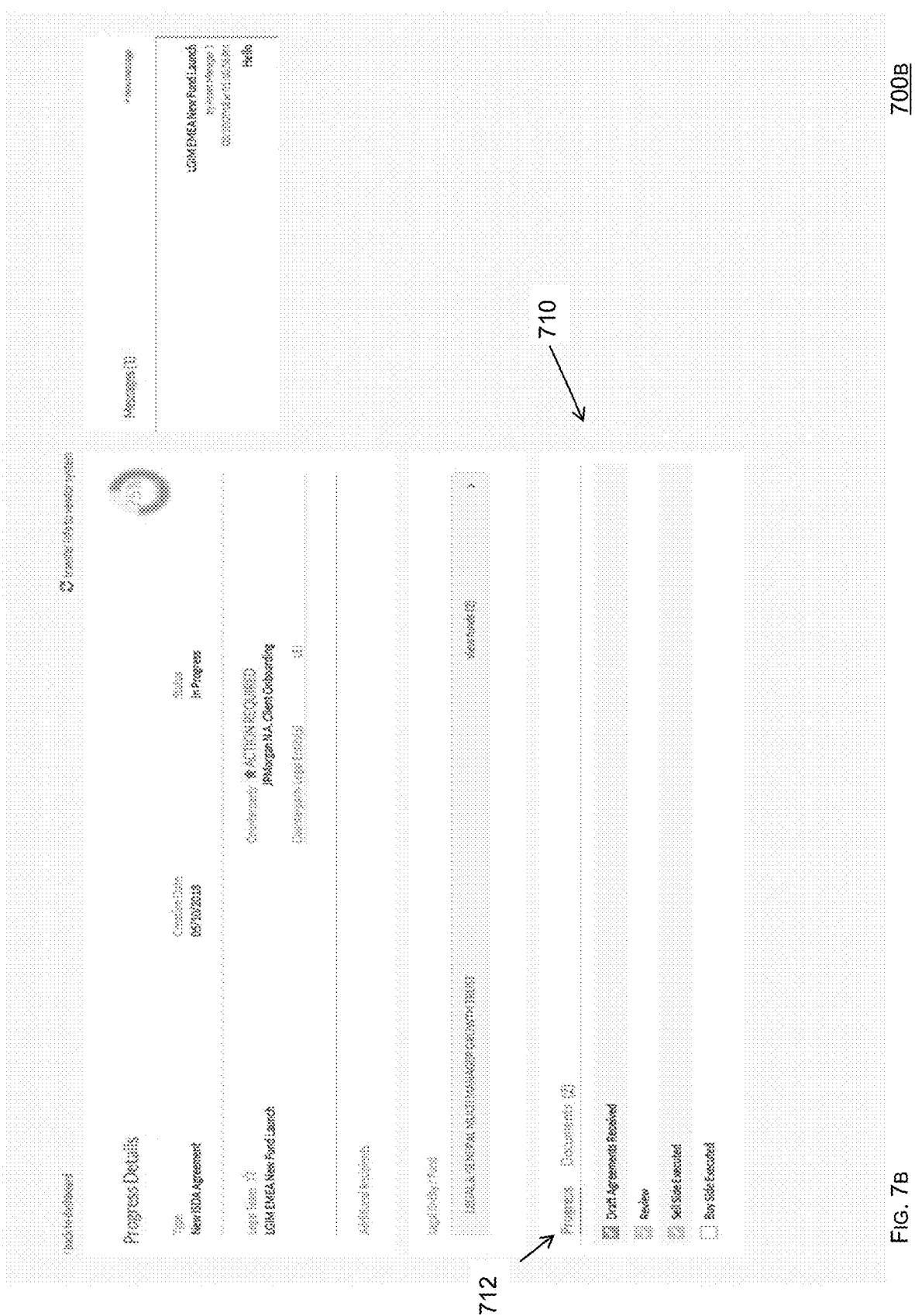
Figure 7C:
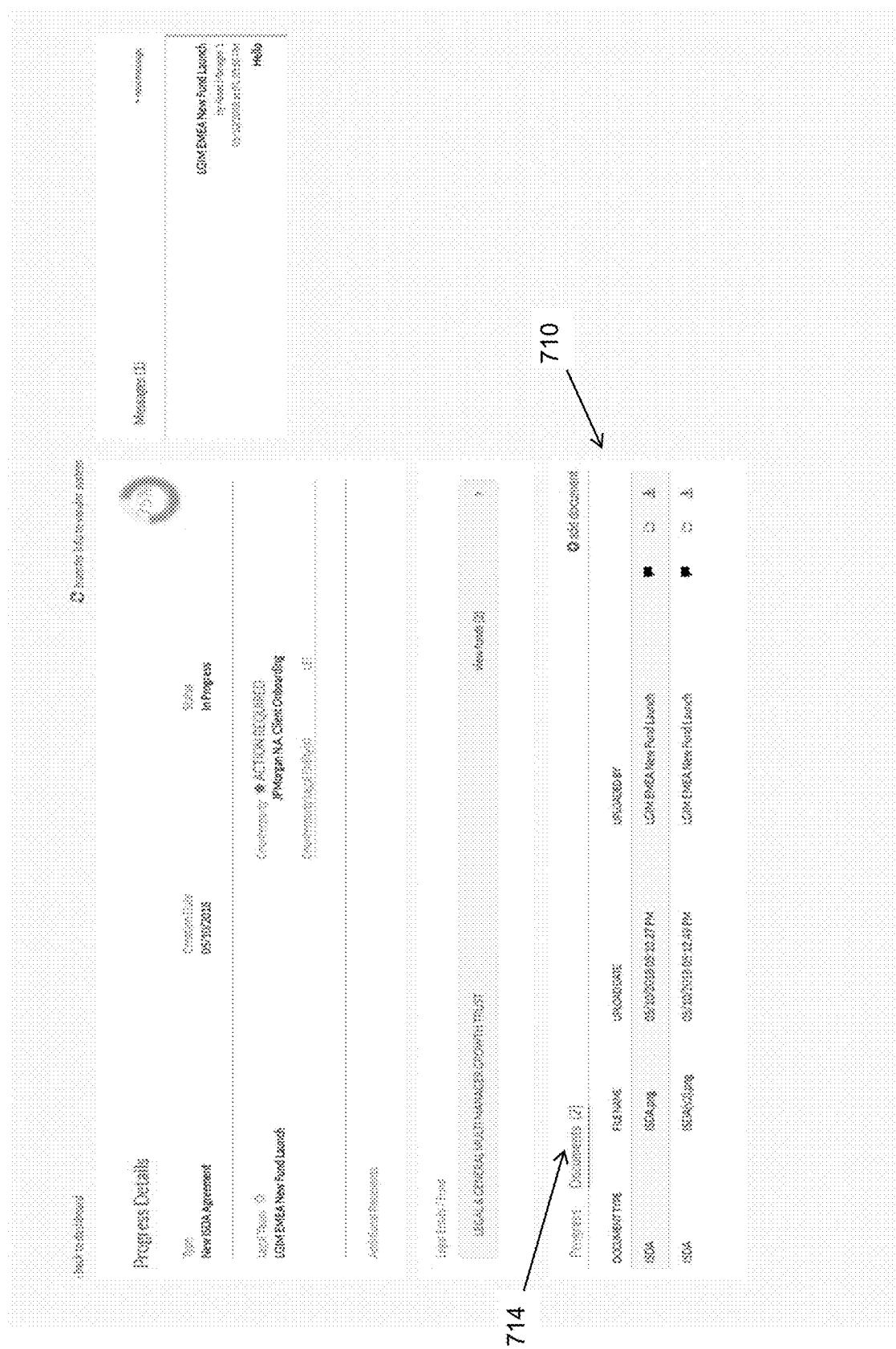

FIGS. 7A-7C show a flowchart and a pair of screenshots of an embodiment of a technique for updating a progress detail according to this disclosure. A process 700A is performed via the network topology 100.

In block 702, the interface logic 126 presents a GUI 700B, 700C based on a task identifier, as previously formed based on a plurality of identifiers previously input via a user of a browser, as explained above. The identifiers include an entity identifier, an action identifier, a plurality of item identifiers, a plurality of category identifiers, or others. The GUI 700B, 700C is similar to the GUI 600B, 600C except for a lower part 710 thereof. The lower part 710 includes a first page hyperlink 712 and a second page hyperlink 714, as selectively switchable therebetween.

In block 704, the interface logic 126 populates the GUI 700B, 700C with a plurality of strings based on the entity identifier, the action identifier, the item identifiers, and the category identifiers. The strings correspond to the entity identifier, the action identifier, the item identifier, and the category identifier. For example, the strings can be labels, whether passive or active (hyperlinked) to aid in user interactivity.

In block 706, the interface logic 126 communicates with the metadata logic 136 such that the GUI 700B, 700C presents (1) a tabular menu on the GUI 700B based on a plurality of type identifiers associated with the item identifiers and the category identifiers when the first page hyperlink 712 is selected and (2) a tabular menu on the GUI 700C when the second page hyperlink 714 is selected. Note that the tabular menu of the GUI 700B and the tabular menu of the GUI 700C are dynamically linked between each other so that an update in one can update in the other.

The tabular menu associated with the first page hyperlink 712 operates as a progress task list and enables a user input to select a checkbox corresponding to a type identifier associated with that particular item identifier and that particular category identifier, as compared against the set of rules, as explained above. The tabular menu associated with the second page hyperlink 714 operates as a document listing and enables a user to see a document type corresponding to a particular file for a particular item identifier and a particular category identifier and also see various document related information, such as file upload time/date, entity identifier associated with file upload, file comments, file download link, and others.

In block 708, the interface logic 126 communicates with the metadata logic 136 such that the GUI 700B, 700C updates the tabular menu associated with the first page hyperlink 712 or the tabular menu associated with the second page hyperlink 714 with respect to the task identifier based on a user input into at least one of the first page hyperlink 712 or the tabular menu associated with the second page hyperlink 714, with the input being associated with the type identifier.

Figure 8:
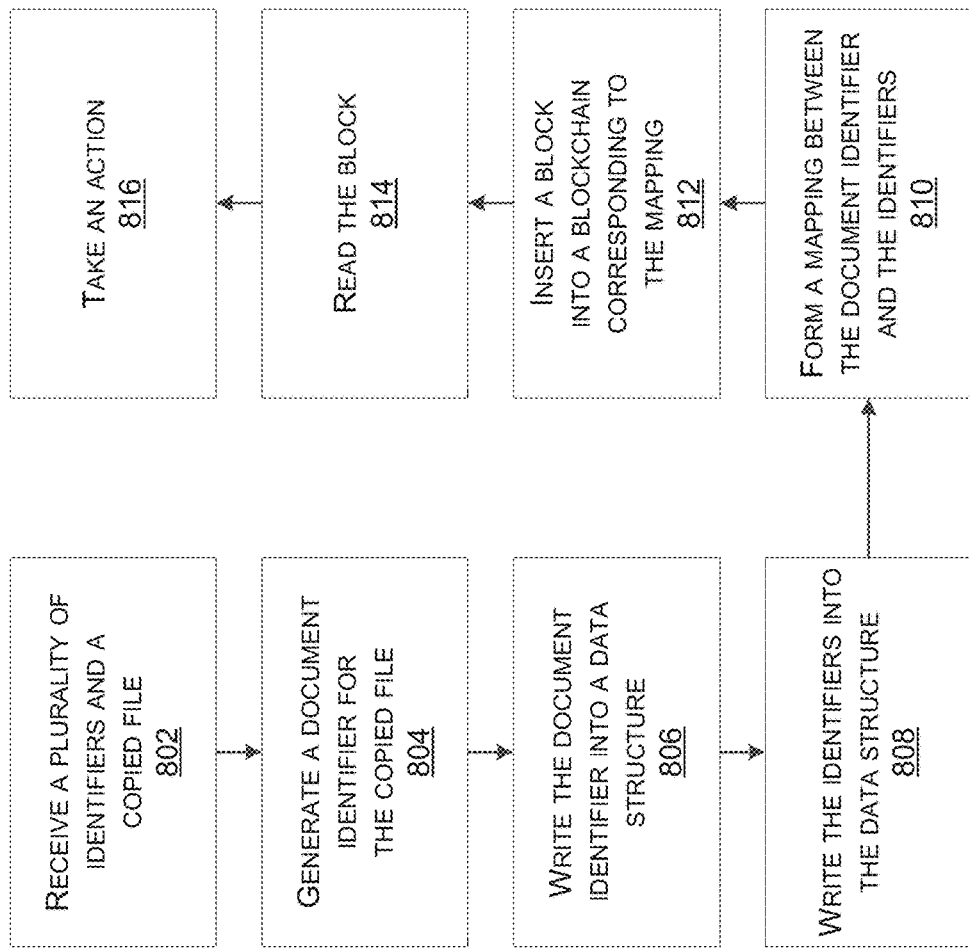
FIG. 8 shows a flowchart of an embodiment of a process for appending to a blockchain according to this disclosure.

FIG. 8 shows a flowchart of an embodiment of a process for appending to a blockchain according to this disclosure. A process 800 is performed via the network topology 100.

In block 802, the metadata logic 136 communicates with the interface logic 126 such that the metadata logic 136 receives a plurality of identifiers and a copied file from a browser of a client, as explained above. For example, the identifiers can include an entity identifier, an action identifier, a plurality of item identifiers, a plurality of category identifiers, or others.

In block 804, the metadata logic 136 generates a document identifier for the copied file, as explained above.

In block 806, the metadata logic 136 writes the document identifier into a data structure, as explained above.

In block 808, the metadata logic 136 writes the identifiers into a data structure, as explained above.

In block 810, the metadata logic 136 forms a mapping between the document identifier and the identifiers in the data structure, as explained above.

In block 812, the metadata logic 136 communicates with the blockchain logic 124 such that the blockchain logic 124 inserts a block into a blockchain, which can correspond to the mapping. The blockchain can be local to or remote from the server 110. The blockchain logic 124 can form the block based on the mapping as the blockchain logic 124 reads the data structure. For example, the block can inform of the document identifier mapping onto the identifiers, where the document identifier has a one-to-many correspondence to each of the identifiers, as explained above. In some embodiments, the block can be informative of the task identifier corresponding to the data structure or the task identifier corresponding to the document identifier in the data structure or any other logical relationship involving the identifiers or the data structure. For example, the block can be created based on a mapping between the document identifier and a group, wherein the group includes at least one of the first entity identifier, the action identifier, the task identifier, or the second entity identifier.

In block 814, the blockchain logic 124 reads the block in the blockchain.

In block 816, the blockchain logic 124 can communicate with any logic local to or remote from the server 110 to take an action, whether the logic is hardware-based or software-based. For example, the action can include reading data, writing data, selecting data, deleting data, formatting data, sending or receiving a message to a client or a data source, whether local or remote from the server 110, communicating with an input device or an output device, whether local or remote from the server 110, or others.

Figure 9:
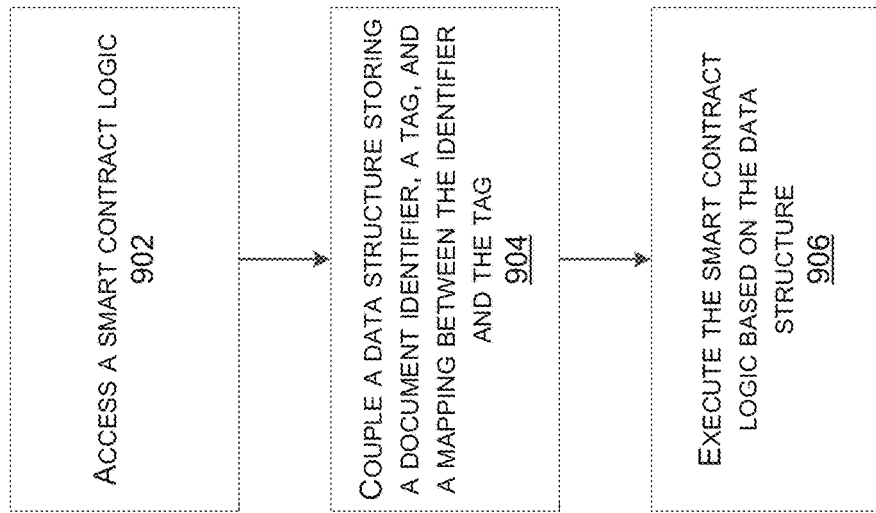
FIG. 9 shows a flowchart of an embodiment of a process for executing a smart contract based on a data structuring according to this disclosure.

FIG. 9 shows a flowchart of an embodiment of a process for executing a smart contract based on a data structuring according to this disclosure. A process 900 is performed via the network topology 100.

In block 902, the blockchain logic 124 accesses a smart contract logic, whether local to or remote from the server 110. For example, the smart contract logic can include an Ethereum platform logic. For example, the smart contract logic can include various executable code, such as functions, objects, or others, stored in a data structure, such as a file or others, whether including any identifiers, as explained above, or excluding any identifiers, as explained above.

In block 904, the blockchain logic 124 couples the smart contract logic to a data structure storing a document identifier, a tag, and a mapping between the document identifier and the tag, which can include a one-to-many correspondence. Such coupling can include the blockchain logic 124 interfacing with the permission logic 124 to grant a read access to the data structure storing the document identifier, the tag, and the mapping or the blockchain logic 124 interfacing with the permission logic 124 to upload the data structure storing the document identifier, the tag, and the mapping from the server 110 onto another server, or another operative way to enable the smart contract logic to act based on a content of the data structure or a grouping associated with the data structure, such as when the task identifier is grouped with the data structure. Note that the data structure storing the document identifier, the tag, and the mapping can be stored local to or remote from the server 110.

In block 904, the blockchain logic 124 causes the smart contract logic to execute based on the data structure, such as a content of the data structure. For example, the blockchain logic 124 can authorize or request execution or not deny the read access for the data structure to the smart contract logic.

Figure 10:
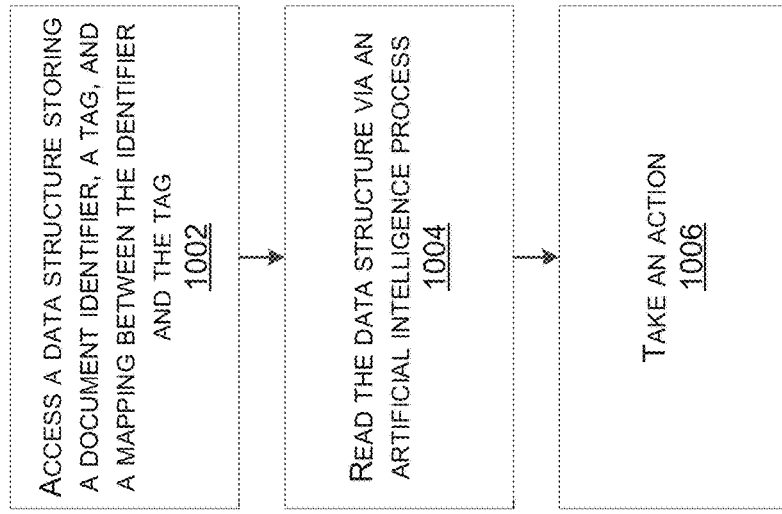
FIG. 10 shows a flowchart of an embodiment of a process for reading a data structuring via an artificial intelligence (AI) process according to this disclosure.

FIG. 10 shows a flowchart of an embodiment of a process for reading a data structuring via an artificial intelligence (AI) process according to this disclosure. A process 1000 is performed via the network topology 100.

In block 1002, the application 122 accesses a data structure storing a document identifier, a tag, and a mapping between the identifier and the tag, as explained above.

In block 1004, the application 122 employs an artificial intelligence process to read the data structure such that the application 122 determines a population pattern, a storage pattern, an organizational pattern, a date/timing pattern, a sequence pattern, a tag pattern, a task pattern, an action patter, an item pattern, a category pattern, a product pattern, a type pattern, an identifier pattern, or any other pattern or classification or lack of any thereof within the data structure based on a content of the data structure. For example, the artificial intelligence process can employ machine learning, image processing, text analysis, querying of a remote data source, or others, whether local to or remote from the server 110, inclusive of any cloud-based or distributed environments.

In block 1006, the application 122 takes an action or cause another logic entity to take an action, whether the entity is hardware or software based. For example, the action can include reading data, writing data, selecting data, deleting data, formatting data, sending or receiving a message to a client or a data source, whether local or remote from the server 110, communicating with an input device or an output device, whether local or remote from the server 110, or others.

Figure 11:
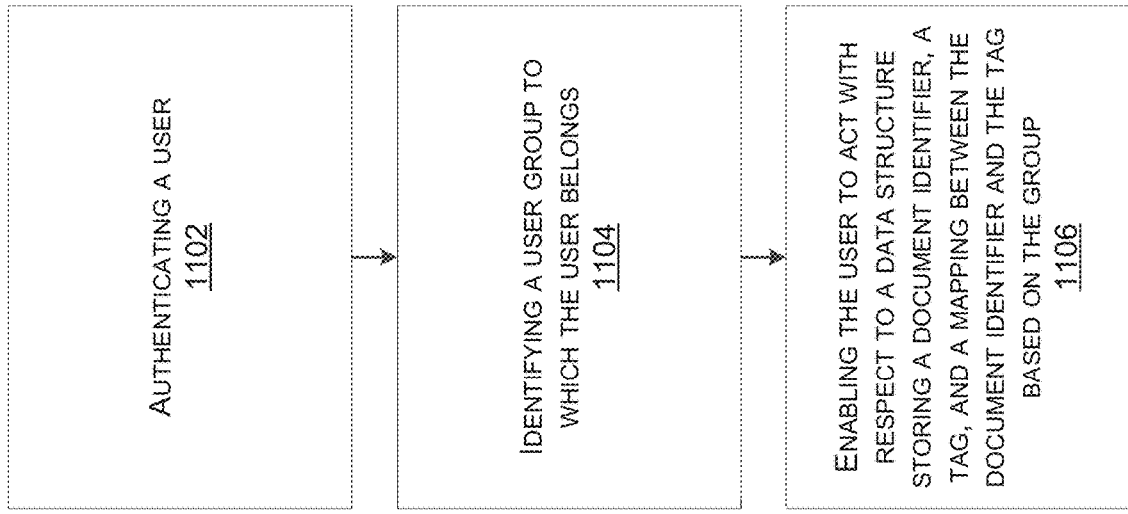
FIG. 11 shows a flowchart of an embodiment of a process for a user action with respect to a data structure based on a belonging to a user group according to this disclosure.

FIG. 11 shows a flowchart of an embodiment of a process for a user action with respect to a data structure based on a belonging to a user group according to this disclosure. A process 1100 is performed via the network topology 100.

In block 1102, the privilege logic 138 authenticates a user based on the user operating a browser hosting a session with the server 110, as explained above. Note that, during the session, the user is associated with a user identifier hierarchically positioned under or related to an entity identifier, as explained above. For example, the entity identifier can have a plurality of user identifiers hierarchically associated therewith.

In block 1104, the privilege logic 138 interfaces with the metadata logic 136 to identify a user group to which the user belongs based on the user identifier. The user group corresponds to the task identifier, as explained above. For example, this identification can occur via identifying the task identifier associated with the entity identifier to which the user identifier is related or vice versa. For example, this can occur via the task identifier being associated with the entity identifier and, since the entity identifier can have a plurality of user identifiers associated therewith, the user identifier can be looked up against the user identifiers associated with the entity identifier for that task identifier. Note that the user identifier can be associated with a plurality of task identifiers simultaneously. As such, the user group to which the user belongs can be identified.

In block 1106, the permission logic 142 interfaces with the metadata logic 136 to enable the user to act with respect to a data structure storing a document identifier, a tag, and a mapping between the document identifier and the tag based on the group, as explained above. As such, once the user group has been identified, the user can access a file based on the document identifier associated with the task identifier for the user group to which the user belongs and then access the file based on the document identifier, as explained above.

FIGS. 12-22 show a plurality of screenshots of an embodiment of a user interface operating based on a data structure storing a mapping between a document identifier and a plurality of tags according to this disclosure.

Figure 12:
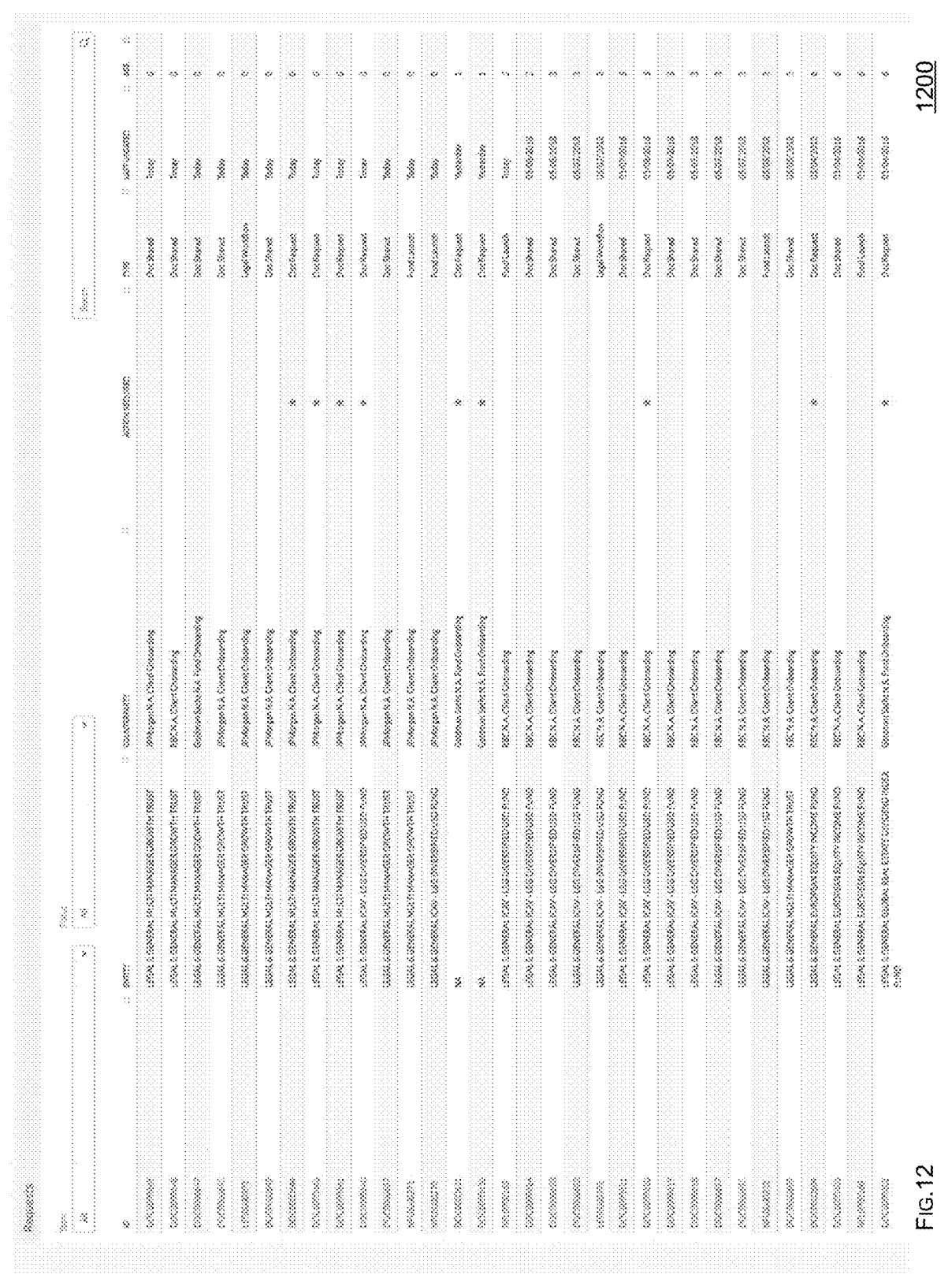

FIG. 12 shows a GUI 1200 which, as explained above, tabularly displays a grid containing a task identifier column listing a plurality of task identifiers (hyperlinkable), a first entity identifier column listing a plurality of first entity identifiers for the task identifiers, a second entity identifier column listing a plurality of second entity identifiers for the task identifiers, an action required identifier column listing a plurality of action identifiers (binarily-presented stars) based on a type identifier and a set of rules for the task identifiers, and an age identifier column listing a plurality of age identifiers based on a set of rules for the task identifiers (as tracked via data structures).

Figure 13:

FIG. 13 shows a GUI 1300, which as explained above, presents the checkbox based grid 616, as explained above. Note that for the item identifier (2172), the category identifiers (USD Repos and Non-USD Repos) are complete, as indicated by checked checkboxes that are also made visually distinct. In contrast, other category identifiers are not checked to be completed. Also, note that some category identifiers (equity swaps) are paused, as indicated by a visually distinct icon.

Figure 14:
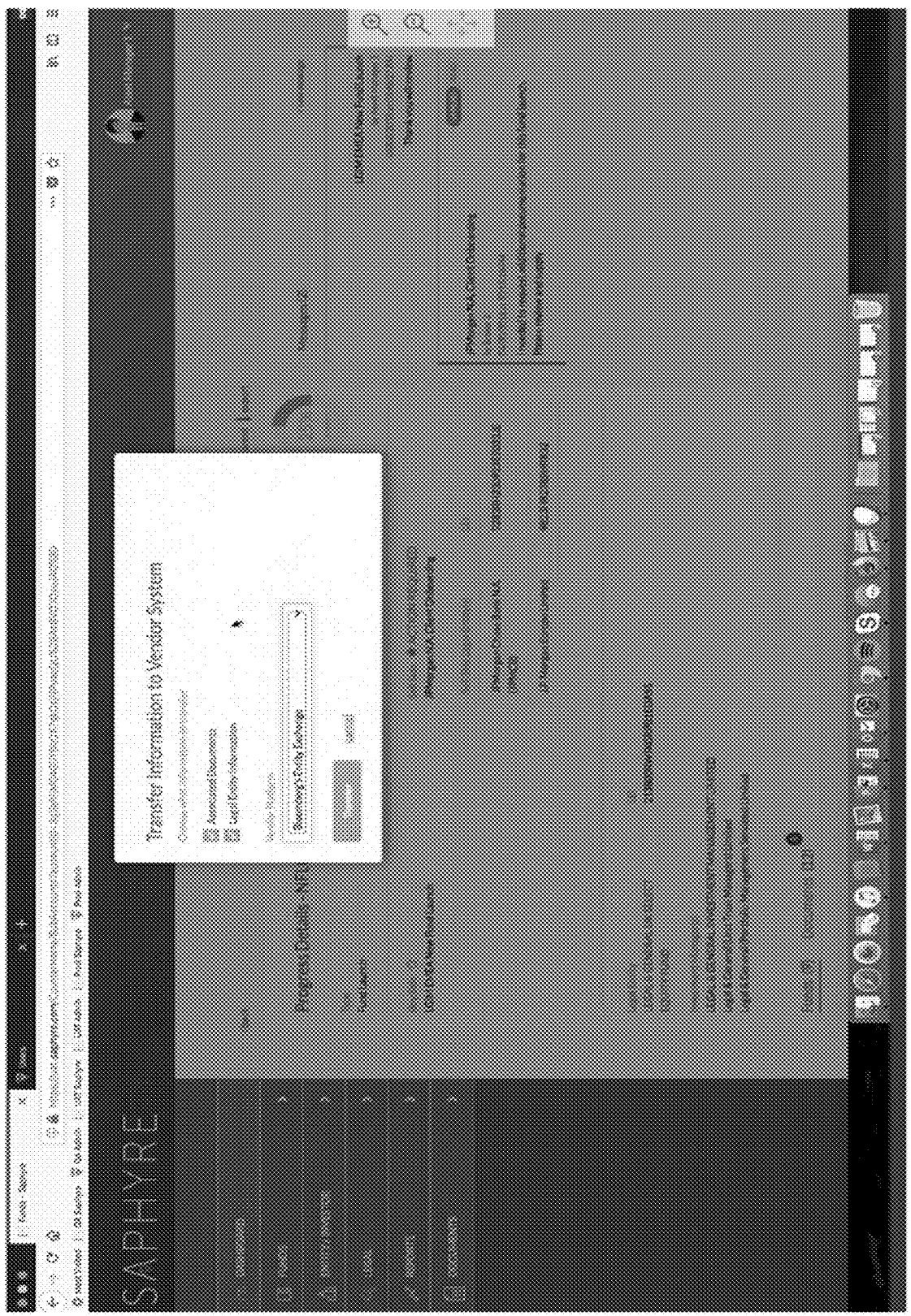

FIG. 14 shows a GUI 1400, which as explained above, via the export logic 130, enables a user to export a data structure with a document identifier, a tag, and a mapping between the document identifier and the mapping to another server. For example, the data structure storing the document identifier, the first entity identifier, the second entity identifier, and the action identifier is exportable as a data file, such as a comma-separated-value file, a flat file, or others.

Figure 15:
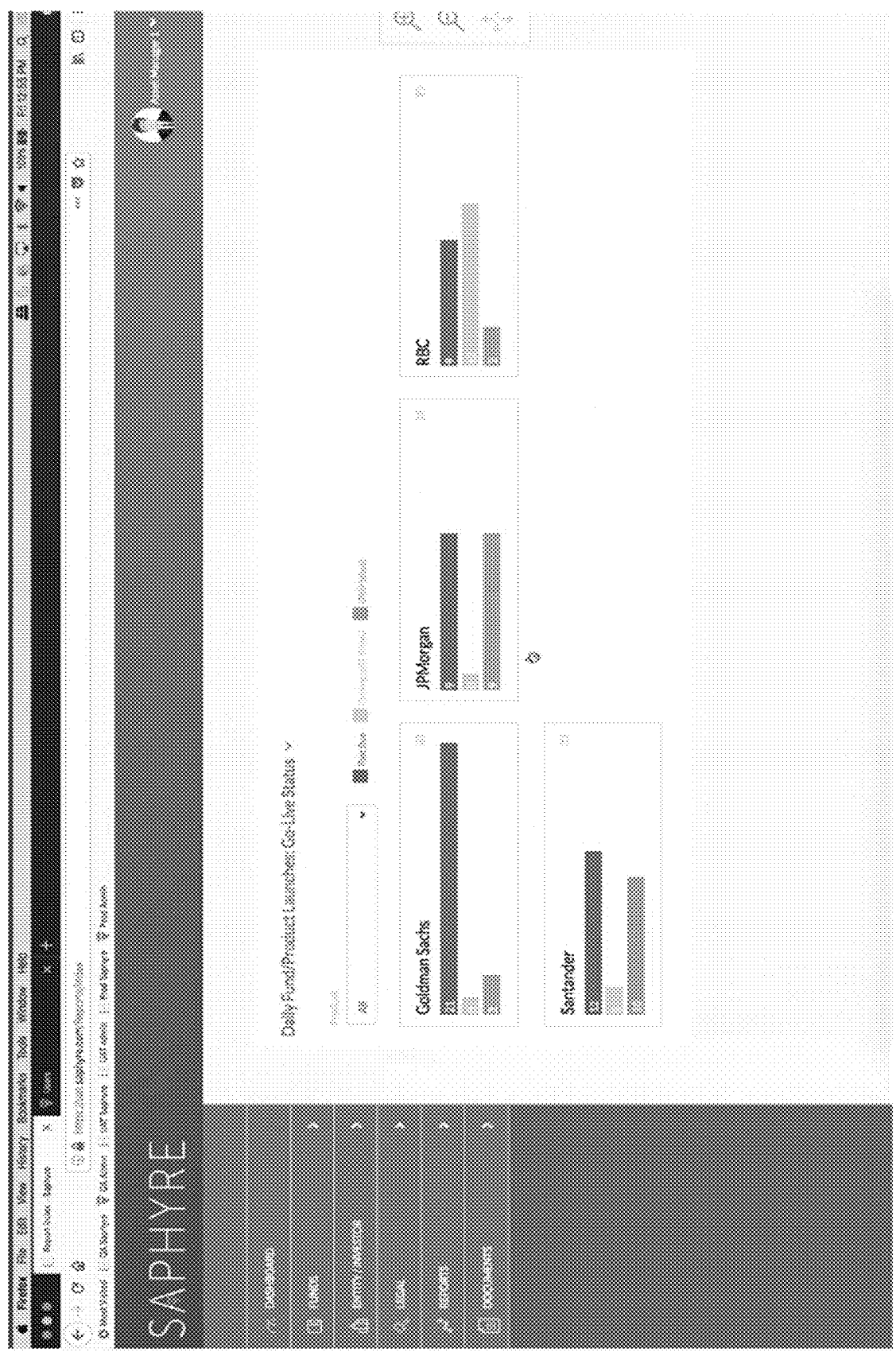

FIG. 15 shows a GUI 1500, which as explained above, via the progress logic 138, enables tracking of a plurality of workflows associated with a plurality of entity identifiers based on a plurality of task identifiers. The workflows corresponds to a plurality of histograms corresponding to the entity identifiers and track which documents are past due or coming due or OK, as measured against a set of rules, whether for a particular task identifier or entity identifier, as explained above. For example, the set of rules can include a target document upload date which can be input via the browser 118 or the browser 120, as explained above.

Figure 16:
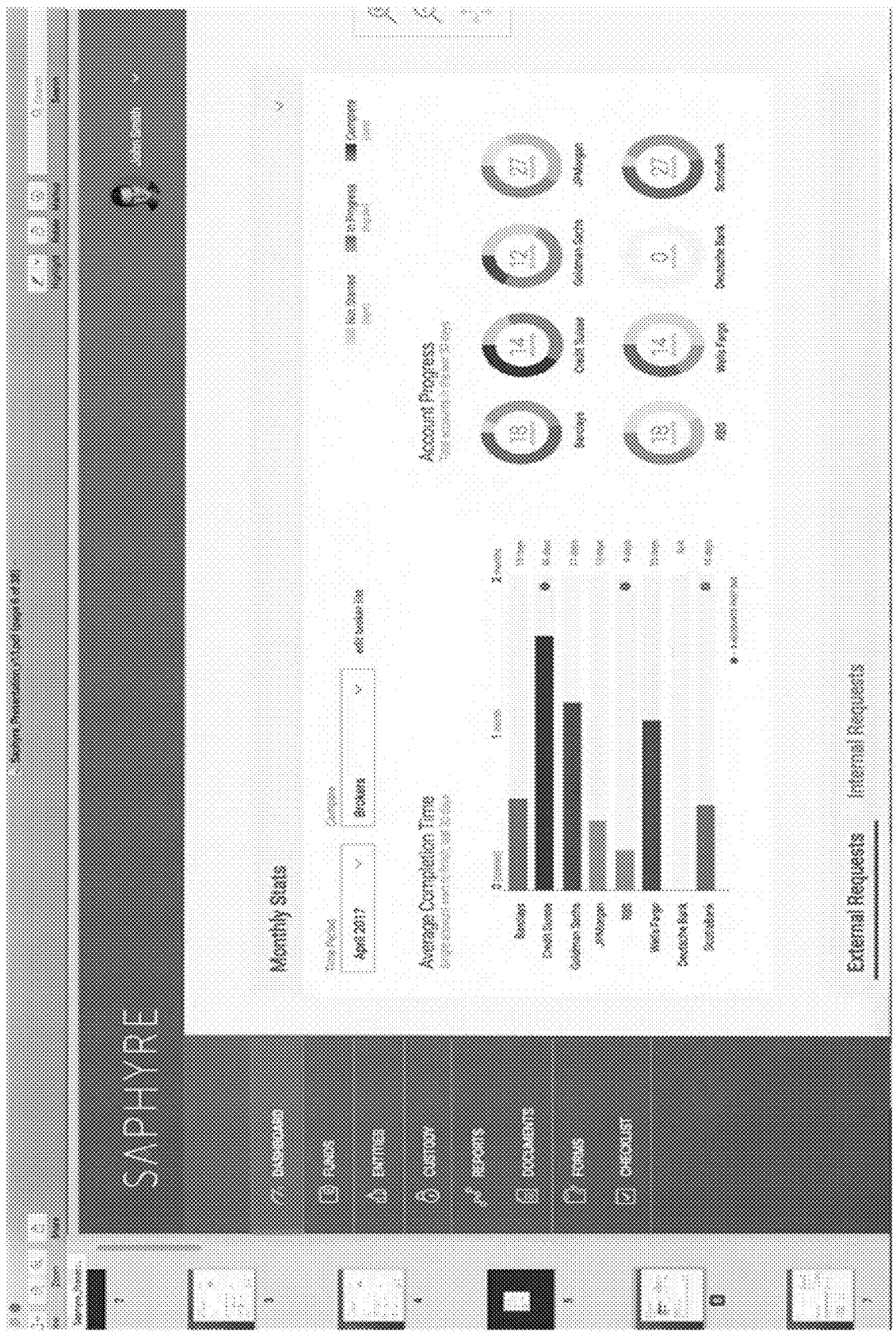

FIG. 16 shows a GUI 1600, which as explained above, via the progress logic 138 enables a more granular document tracking with respect to the GUI 1500. As shown, this type of tracking can be based on entity identifiers for specific time periods, as measured against a set of rules, whether for a particular task identifier or entity identifier, as explained above.

Figure 17:
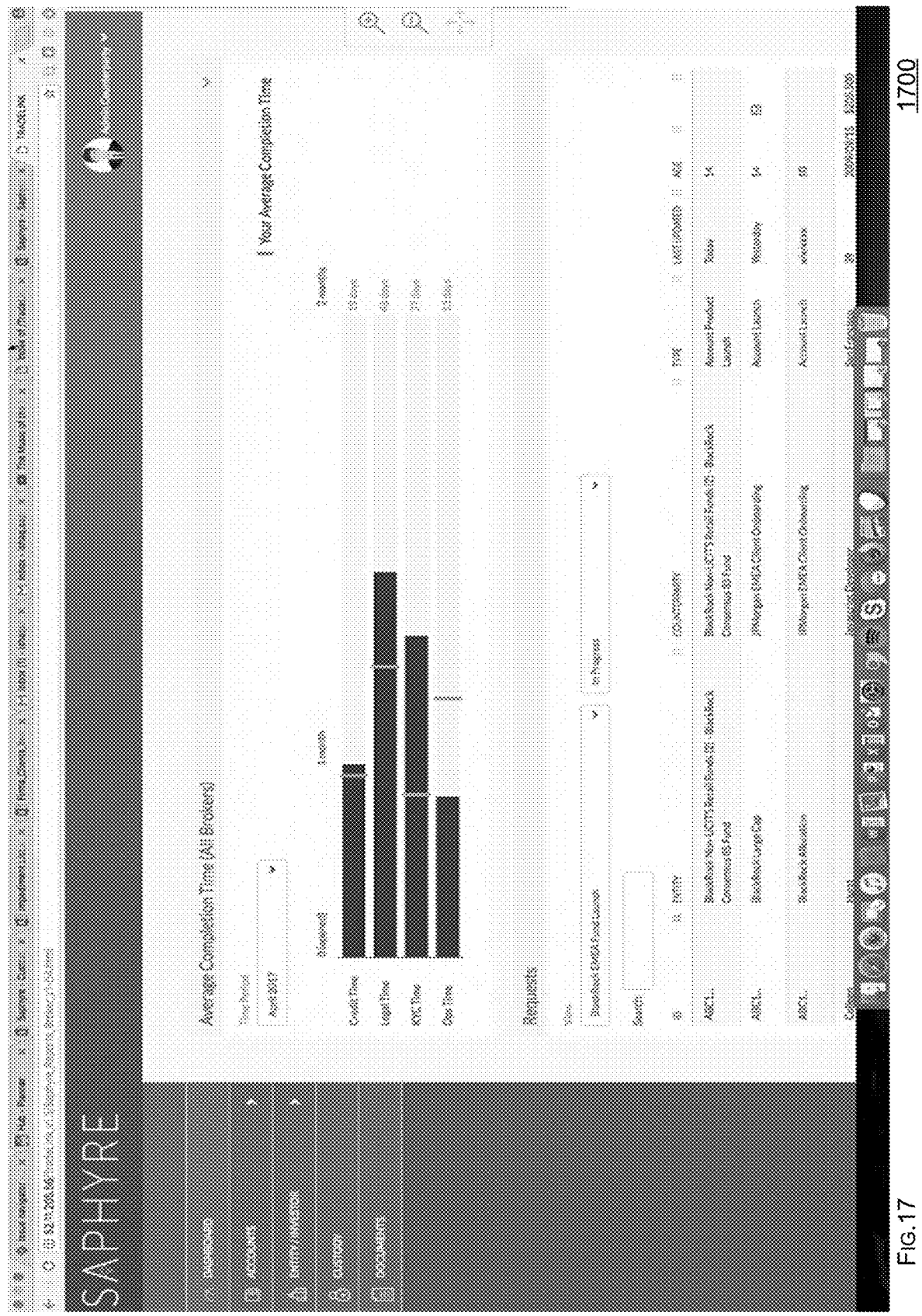

FIG. 17 shows a GUI 1700, which as explained above, via the progress logic 138, enables even more granular document tracking with respect to the GUI 1600. Here, the GUI 1700 depicts average task completion time for a particular identifier with respect to various workflows, as measured against a set of rules, whether for a particular task identifier or entity identifier, as explained above.

Figure 18:
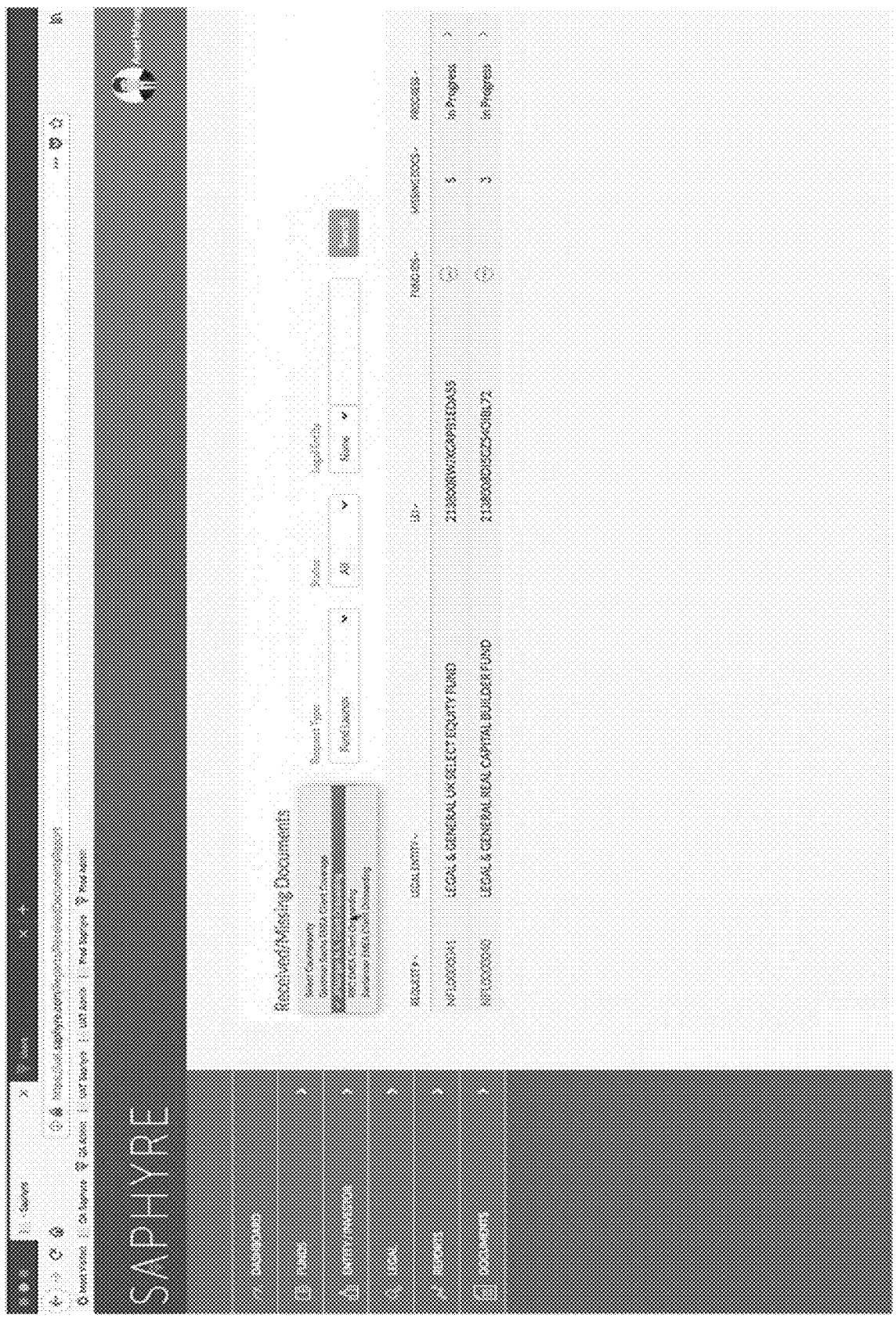

FIG. 18 shows a GUI 1800, which as explained above, via the progress logic 138, enables tracking of documents that are received or missing for an entity identifier and an action identifier based on a plurality of hyperlinked task identifiers and a plurality of entity identifiers (grouped by task identifiers).

Figure 19:
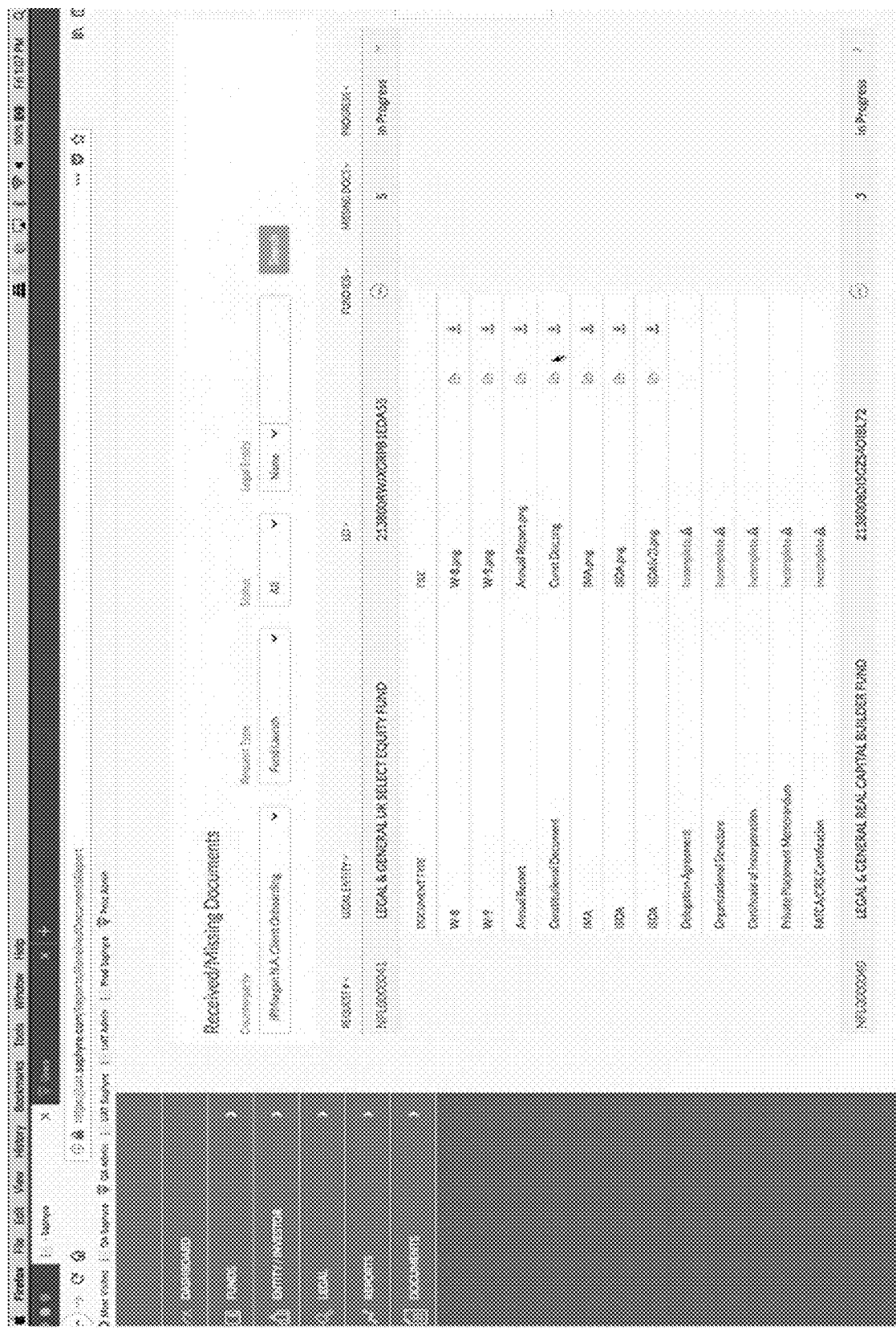

FIG. 19 shows a GUI 1900, which as explained above, enables a more granular view of the GUI 1800 and shows with particularity what happens when one of the hyperlinked task identifiers is activated, i.e., a table showing a plurality of document type identifiers, a plurality of file names, and a plurality of file upload icons, where items are complete and some are incomplete.

Figure 20:
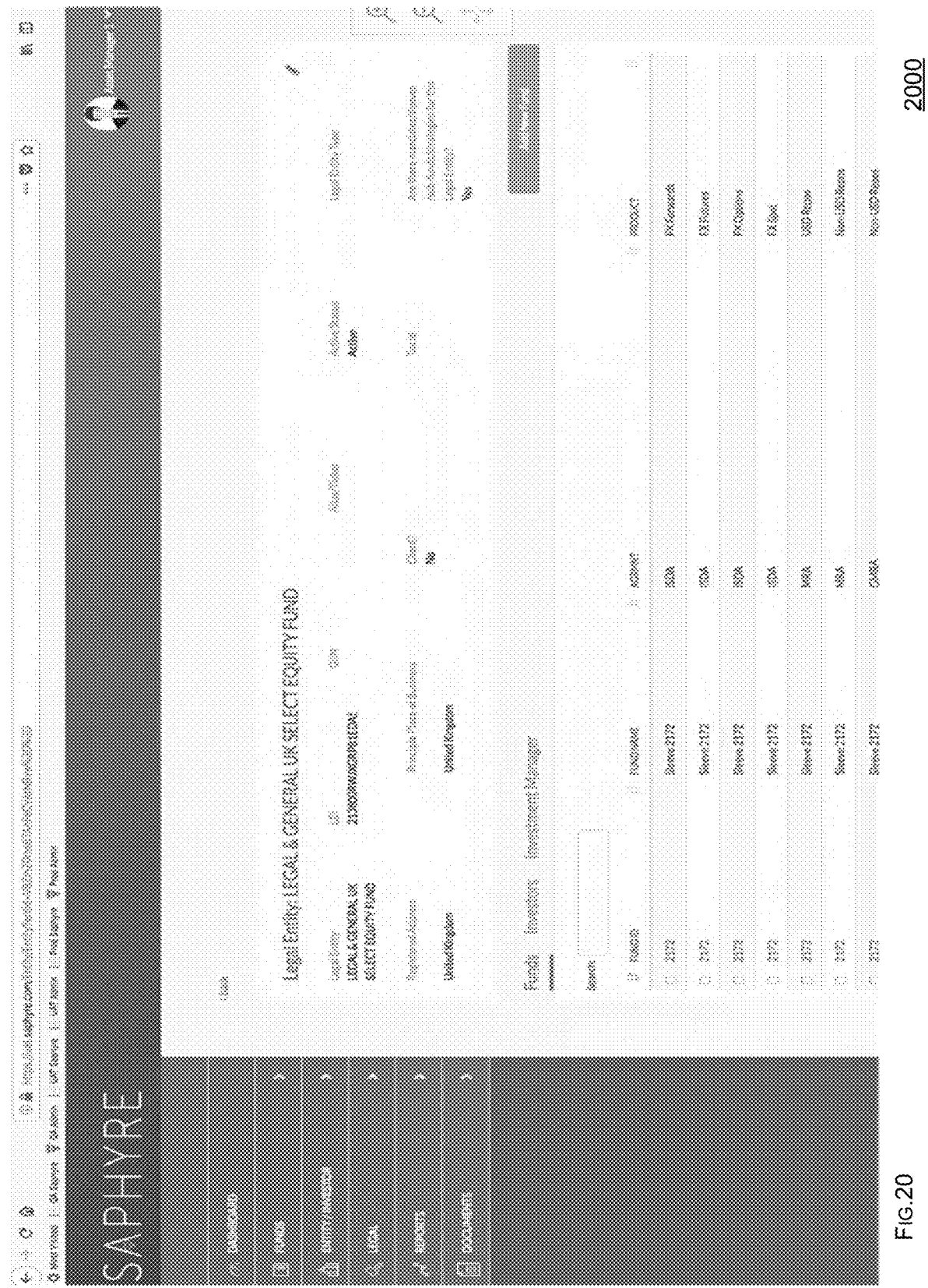

FIG. 20 shows a GUI 2000, which as explained above, shows a tabular view of a plurality of hyperlinked item identifiers and a plurality of category identifiers (grouped by item identifiers) for an entity identifier and an action identifier.

Figure 21:
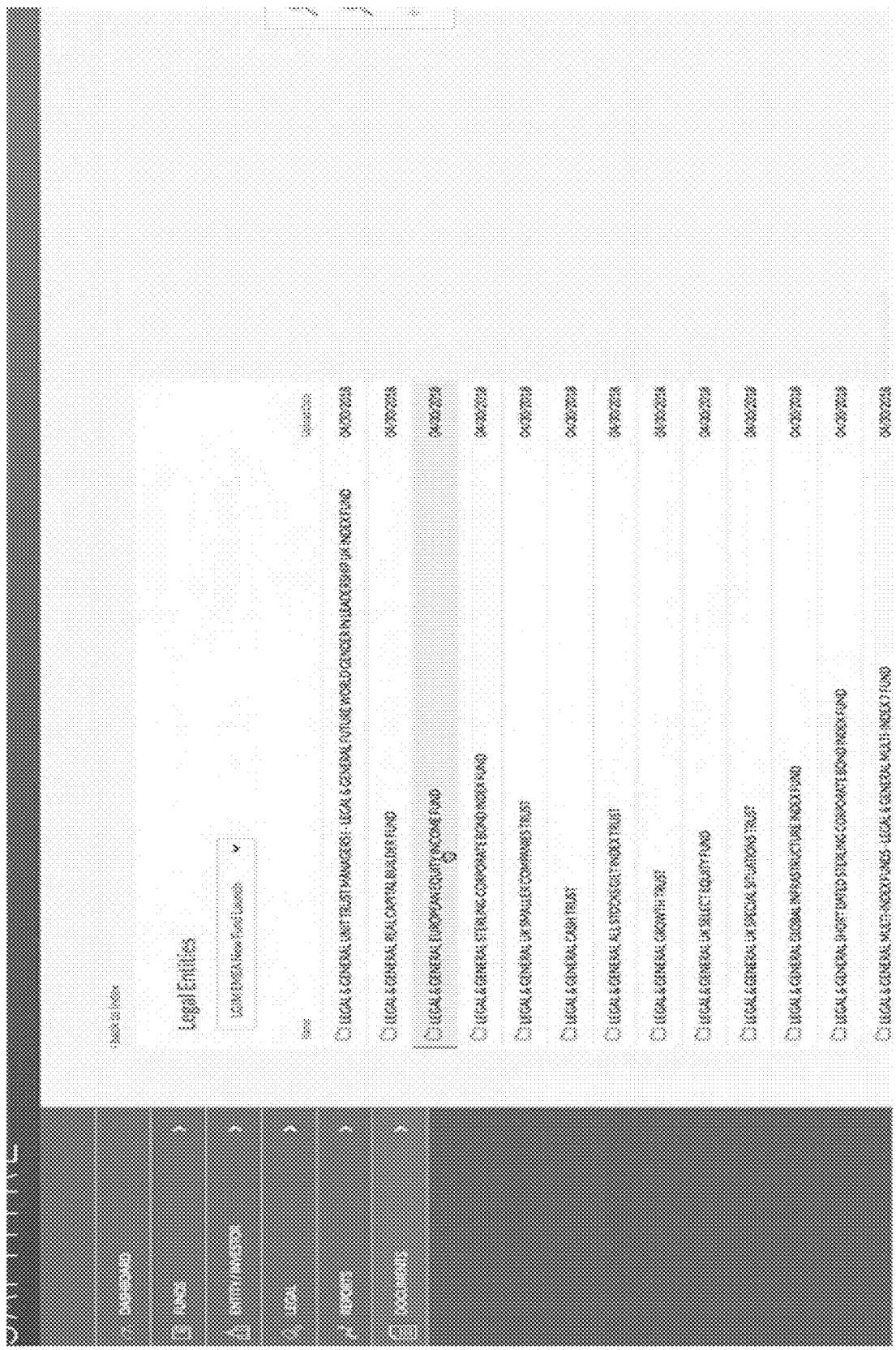

FIG. 21 shows a GUI 2100, which as explained above, shows a listing of entity identifiers (Legal & General) associated with a task identifier (LGIM EMEA New Fund Launch).

Figure 22:
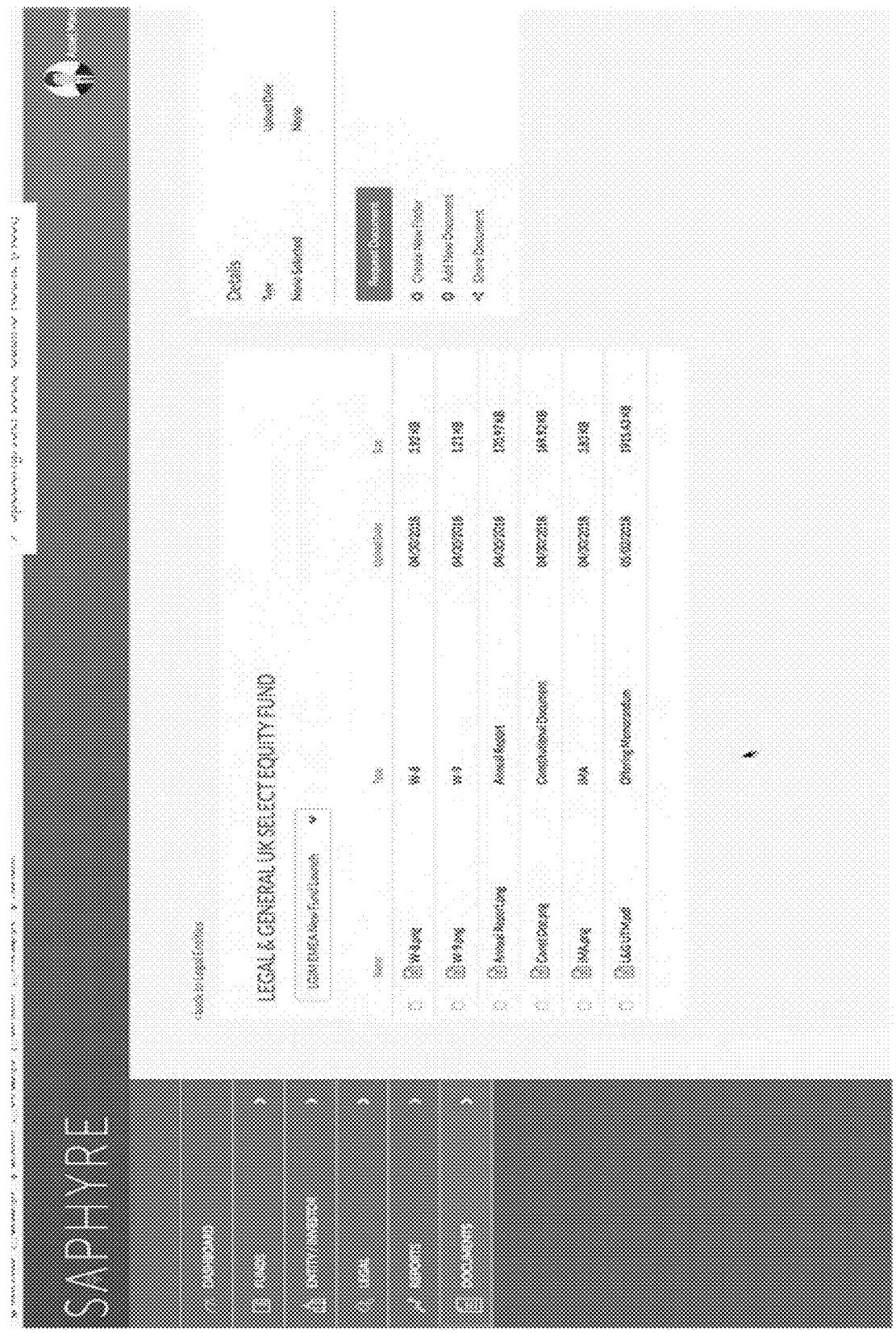
Figure 23A:
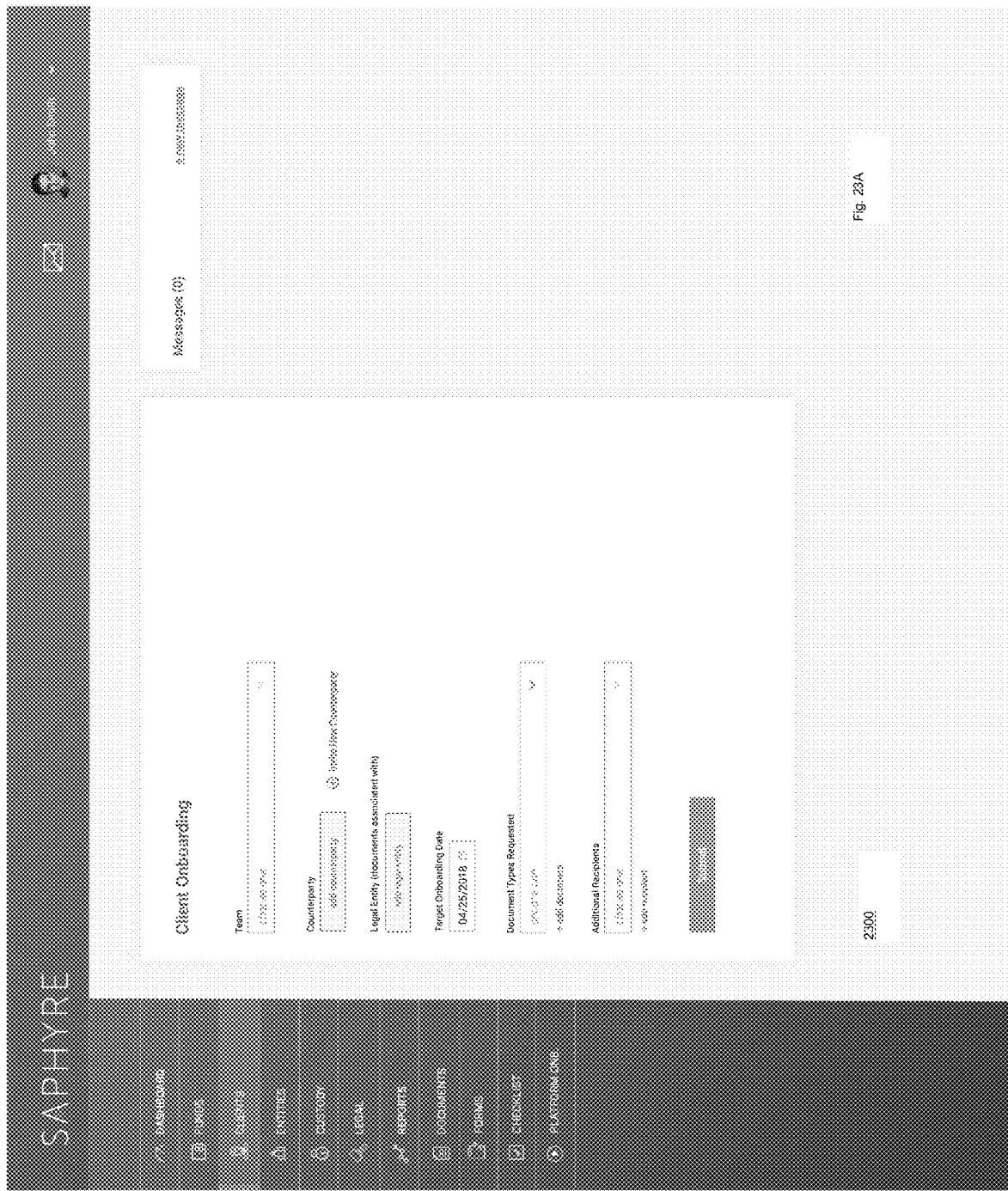
Figure 23B:
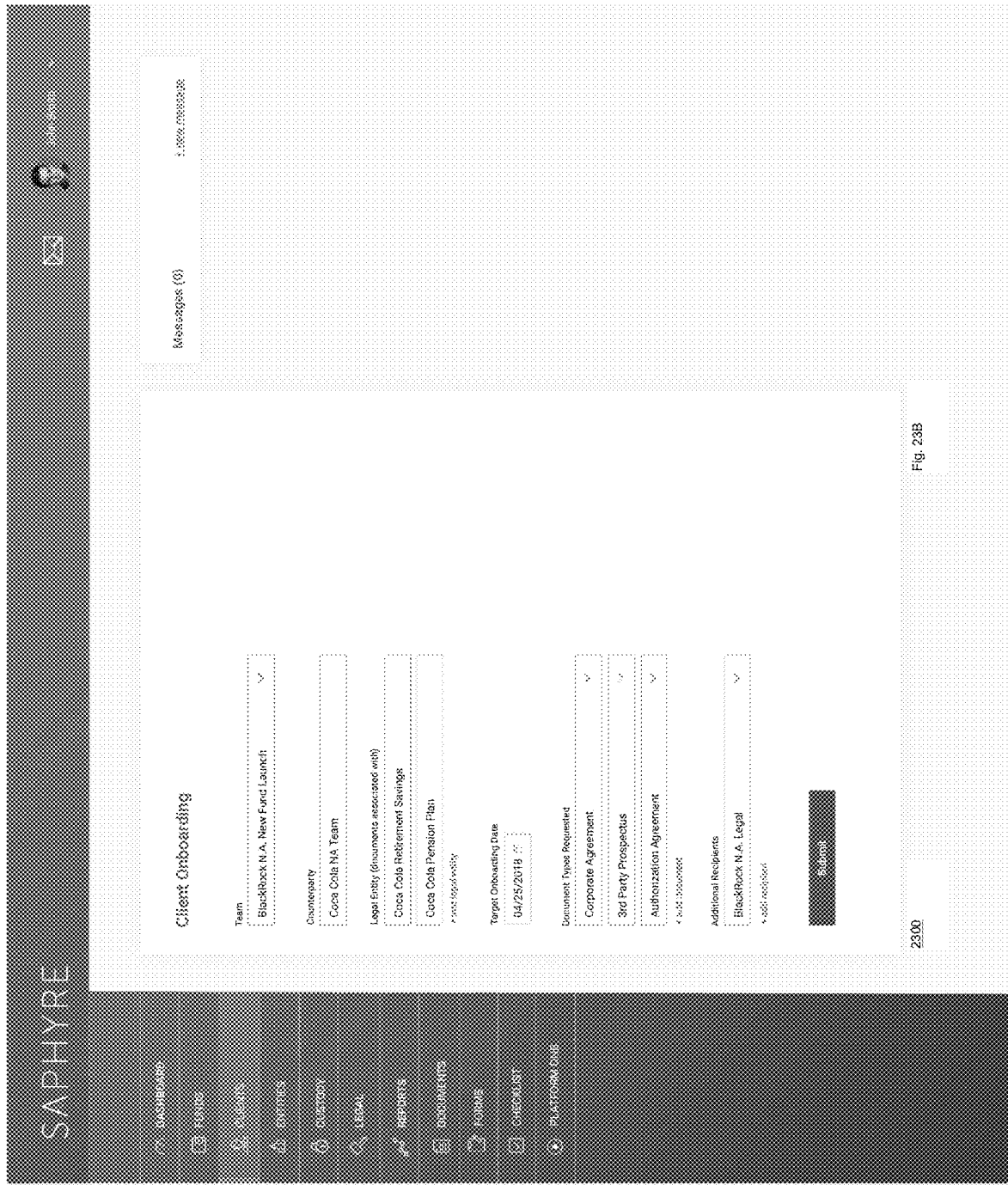
Figure 23C:
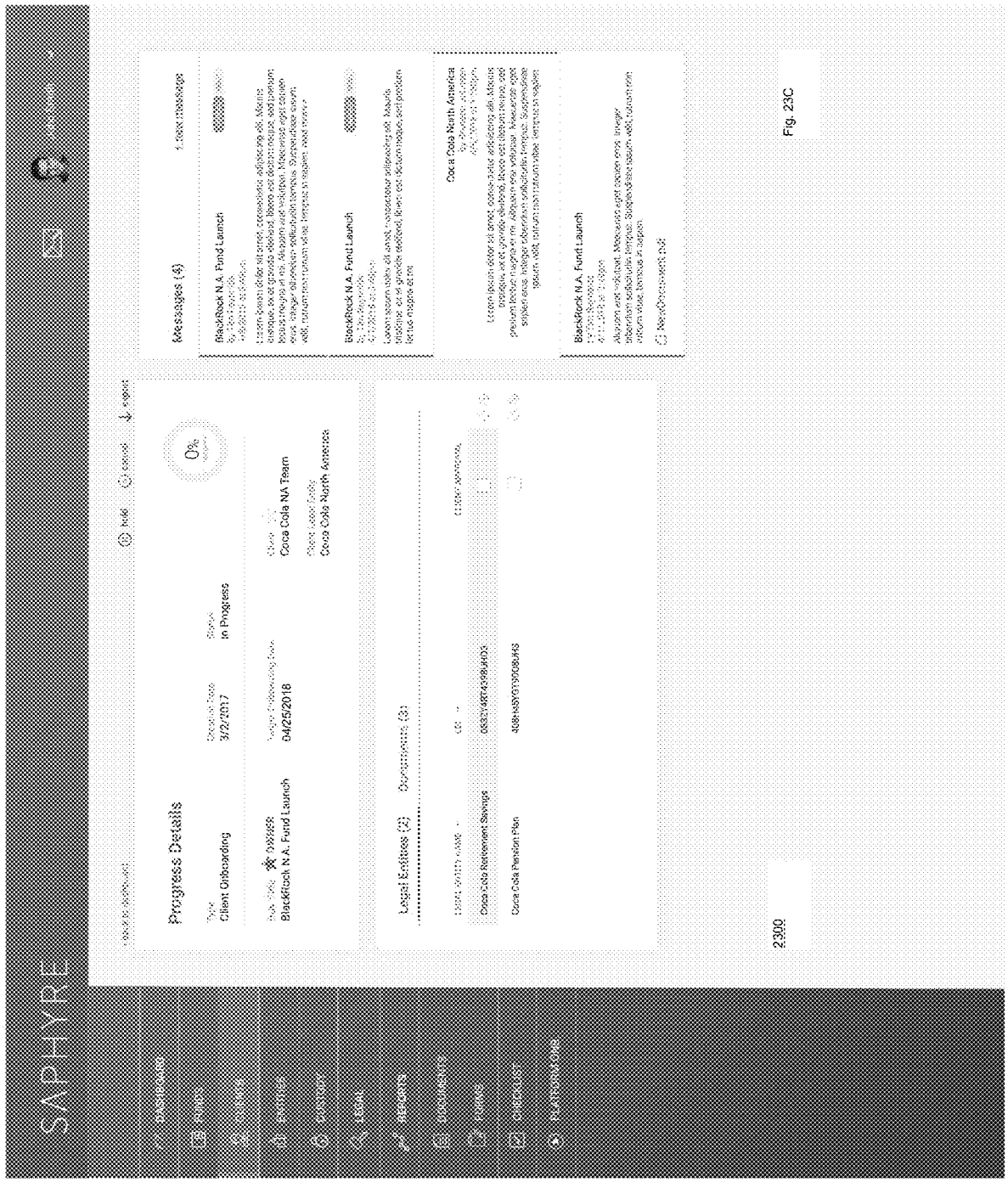
Figure 23D:
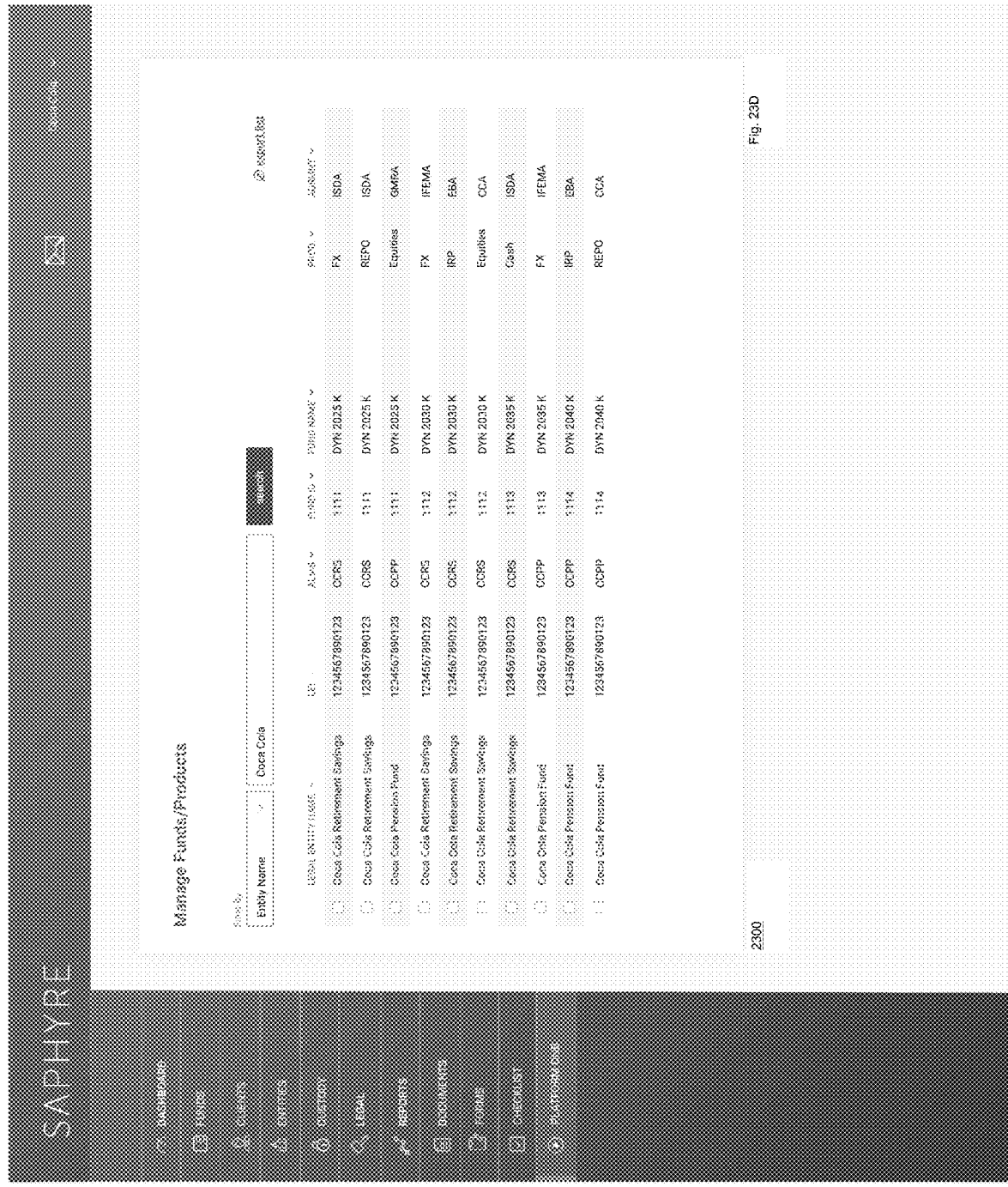
Figure 23E:
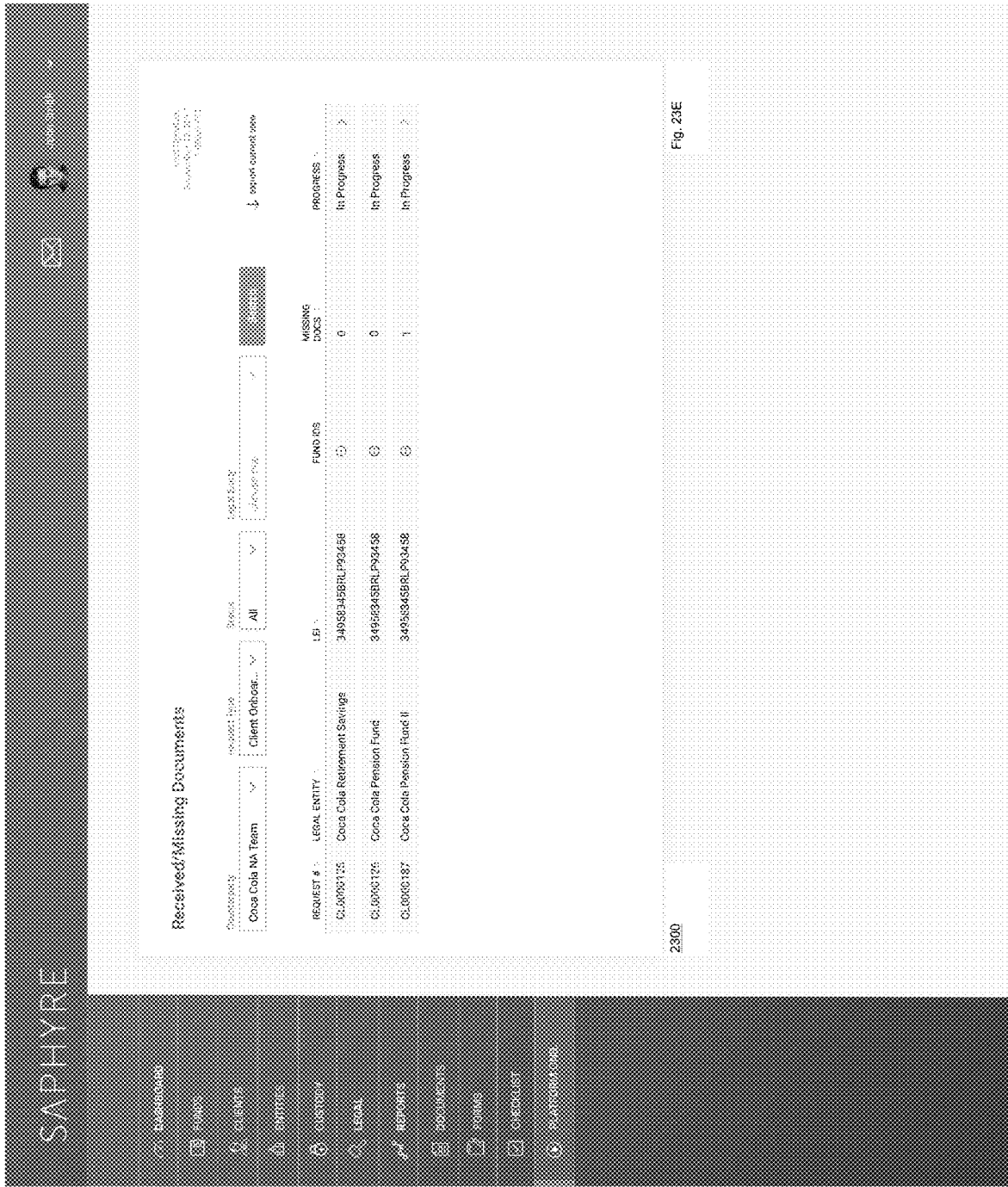
Figure 23F:
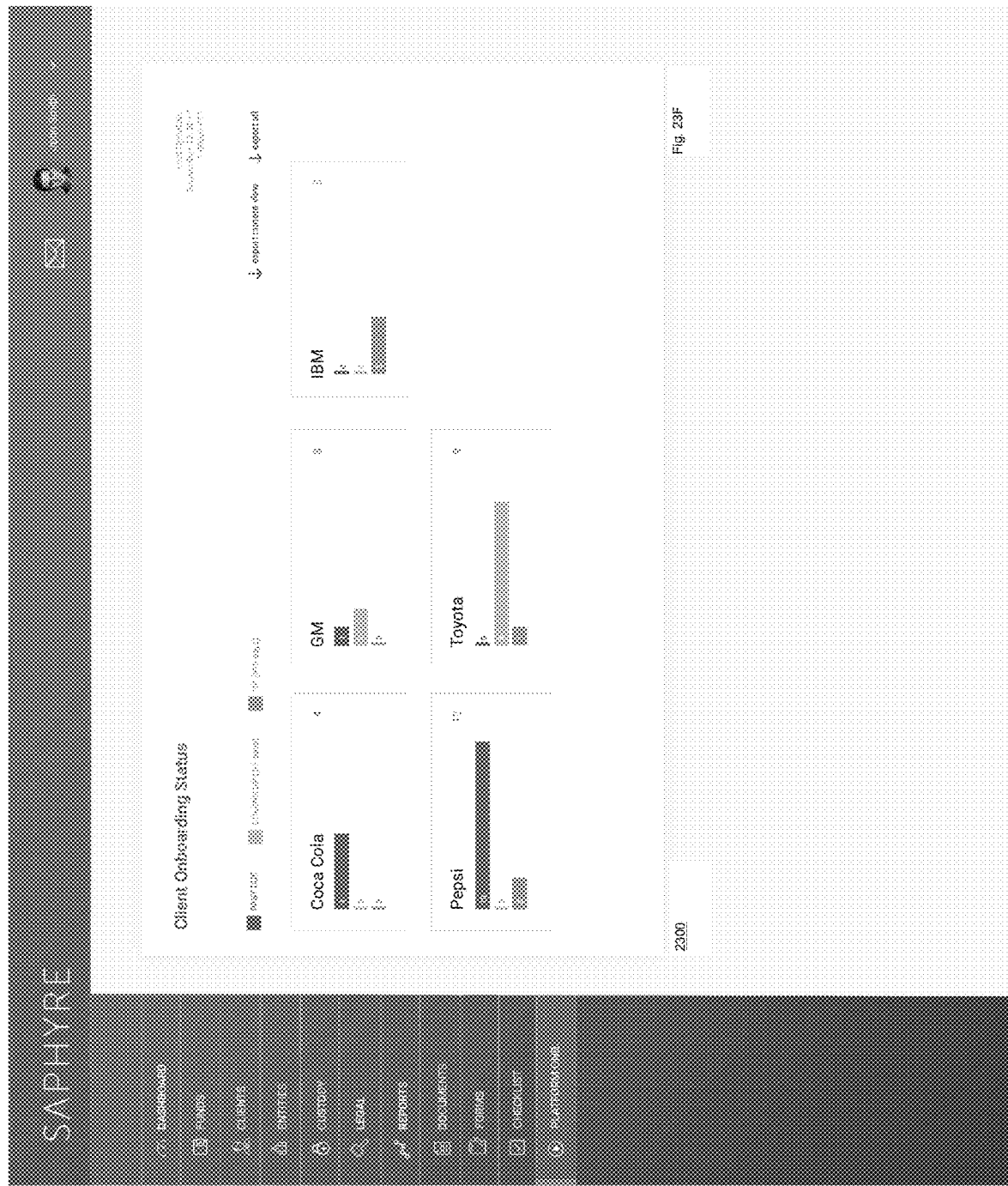
Figure 23G:
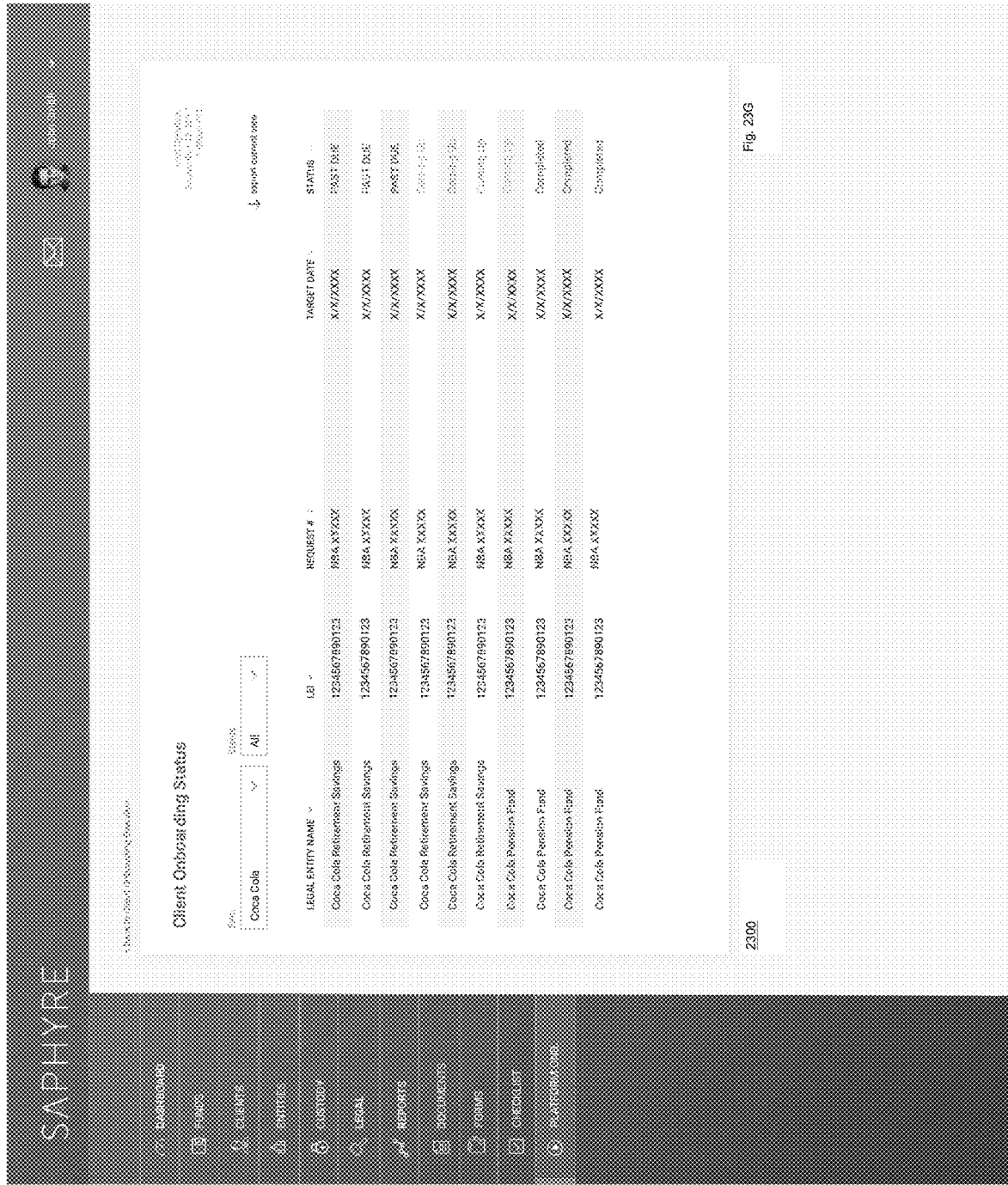
Figure 23H:
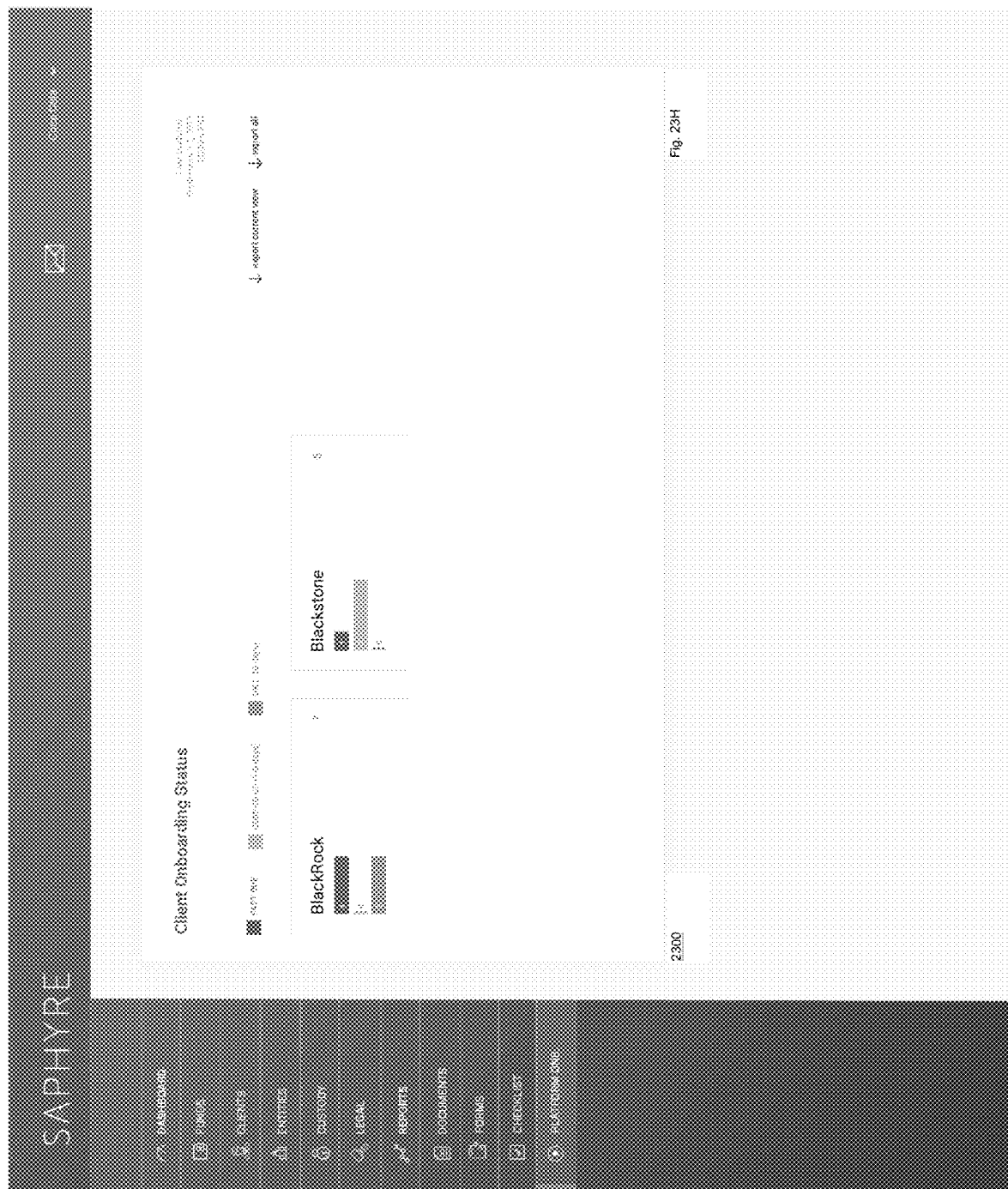

FIG. 22 shows a GUI 2200, which as explained above, shows a listing of file names and document types for a task identifier of the GUI 2100.

FIGS. 23A-23I show a plurality of screenshots of an embodiment of a multi-user sharing technique according to this disclosure. In particular, a GUI 2300, as explained above, shows a multi-page questionnaire involving a workflow with a plurality of users associated with different entity identifiers. Upon competition of the multi-page questionnaire, a set of rules is formed against which the workflow is evaluated based on files, as uploaded, and compared via a data structure, as explained above. The GUI then presents various tabular menus, which enable document tracking, progress monitoring, and inter-user messaging based on various identifiers, as explained above. In some embodiments, the GUI 2300 is configured to provide a template file for download, where a user downloads the template file, populates the template file as mandated, and uploads the template file as populated. The template file gets validated and once validated can get grouped with a task identifier, as explained above. For example, such grouping can be performed based on identifiers as present in the template file.

In addition, features described with respect to certain example embodiments may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A system comprising:
a plurality of servers is collectively programmed to:
receive a first legal entity identifier (LEI), a second LEI, and an action identifier from a first client;
receive a copy of a file selected via the first client;
generate a task identifier, a data structure, and a document identifier;
group the data structure with the task identifier;
populate the data structure with the document identifier, the first LEI, the second LEI, and the action identifier such that the document identifier (1) maps onto the first LEI, the second LEI, and the action identifier and (2) is associated with the copy;
host a session with a second client, wherein the session is associated with the second LEI and the action identifier;
associate the second client with the task identifier during the session based on the second LEI associated with the session and the action identifier associated with the session matching the second LEI in the data structure and the action identifier in the data structure; and
share the copy with the second client during the session based on the task identifier such that the copy is retrievable via the second client based on the document identifier in the data structure, wherein the copy is shared with the second client during the session based on the task identifier.

2. The system of claim 1, wherein the first client is associated with the first LEI.

3. The system of claim 1, wherein the first client is associated with a third LEI other than the first LEI and the second LEI.

4. The system of claim 1, wherein the copy is shared with the second client during the session via a presentation of a hyperlink on the second client, wherein the copy is at least one of opened or downloaded based on an activation of the hyperlink via the second client during the session.

5. The system of claim 1, wherein the first LEI is identical to the second LEI in value.

6. The system of claim 1, wherein the first LEI is different from the second LEI in value.

7. The system of claim 1, wherein the copy includes a content, wherein the document identifier is generated based on the content.

8. The system of claim 1, wherein the copy includes a characteristic, wherein the document identifier is generated based on the characteristic.

9. The system of claim 1, wherein the plurality of servers is collectively programmed to populate the data structure with the task identifier such that the document identifier is mapped onto the task identifier.

10. The system of claim 1, wherein the file is stored remote from the first client.

11. The system of claim 1, wherein the plurality of servers is collectively programmed to:
receive an item identifier and a category identifier from the first client;
populate the data structure with the item identifier and the category identifier such that the document identifier maps onto the item identifier and the category identifier, wherein the session is associated with the item identifier and the category identifier; and
associate the second client with the task identifier during the session based on the item identifier associated with the session and the category identifier associated with the session matching the item identifier in the data structure and the category identifier in the data structure.

12. The system of claim 11, wherein the action identifier corresponds to the item identifier in a one-to-many correspondence.

13. The system of claim 11, wherein the item identifier corresponds to the category identifier in a one-to-many correspondence.

14. The system of claim 11, wherein the first LEI corresponds to the action identifier in a one-to-many correspondence.

15. The system of claim 11, wherein the second LEI corresponds to the action identifier in a one-to-many correspondence.

16. The system of claim 11, wherein the task identifier corresponds to the document identifier in a one-to-many correspondence.

17. The system of claim 1, wherein the first LEI corresponds to the action identifier in a one-to-many correspondence.

18. The system of claim 1, wherein the second LEI corresponds to the action identifier in a one-to-many correspondence.

19. The system of claim 1, wherein the task identifier corresponds to the document identifier in a one-to-many correspondence.

20. The system of claim 1, wherein the task identifier is generated based on at least one of the first LEI or the second LEI.

21. The system of claim 1, wherein the task identifier is generated based on the action identifier.

22. The system of claim 1, wherein the first client includes a first messaging interface, wherein the second client includes a second messaging interface, wherein the plurality of servers is collectively programmed to enable an internal messaging service between the first client and the second client during the session based on the task identifier after the copy has been shared with the second client during the session.

23. The system of claim 1, wherein the data structure stores an item identifier and a category identifier such that the document identifier maps onto the item identifier and the category identifier, wherein the plurality of servers is collectively programmed to:
    identify a set of rules corresponding to the task identifier;
    monitor a status of a degree of completion of a document set based on the set of rules; and
    present a menu to the first client and the second client after sharing of the copy with the second client during the session, wherein the menu is programmed to depict the status of the degree of completion of the document set with respect to the item identifier and the category identifier based on the set of rules.

24. The system of claim 1, wherein the plurality of servers is collectively programmed to:
    receive an input from the second client during the session;
    search the data structure for a match based on the input;
    identify the match between the input and at least one of the first LEI, the second LEI, the action identifier, or the task identifier;
    identify the document identifier based on the match; and
    share the copy with the second client during the session based on the document identifier.

25. The system of claim 24, wherein the data structure stores an item identifier and a category identifier such that the document identifier maps onto the item identifier and the category identifier, wherein the match is identified between the input and at least one of the first LEI, the second LEI, the action identifier, the task identifier, the item identifier, or the category identifier.

* * * * *